US012634580B2

(12) United States Patent
Imamiya et al.

(10) Patent No.: US 12,634,580 B2
(45) Date of Patent: May 19, 2026

(54) IMAGE CAPTURING APPARATUS, CONTROL METHOD THEREFOR, AND STORAGE MEDIUM

(71) Applicant: CANON KABUSHIKI KAISHA, Tokyo (JP)

(72) Inventors: Junichi Imamiya, Kanagawa (JP); Tsukasa Hirabayashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 69 days.

(21) Appl. No.: 18/906,481

(22) Filed: Oct. 4, 2024

(65) Prior Publication Data

US 2025/0126357 A1 Apr. 17, 2025

(30) Foreign Application Priority Data

Oct. 13, 2023 (JP) .................................. 2023-177769

(51) Int. Cl.
*H04N 23/67* (2023.01)
*H04N 13/332* (2018.01)

(52) U.S. Cl.
CPC ........... *H04N 23/67* (2023.01); *H04N 13/332* (2018.05)

(58) Field of Classification Search
CPC .... H04N 23/67; H04N 13/332; H04N 13/128; H04N 13/207
See application file for complete search history.

(56) References Cited

U.S. PATENT DOCUMENTS

| | | |
|---|---|---|
| 10,848,660 B2 | 11/2020 | Saito |
| 11,949,977 B2 | 4/2024 | Okuwaki |

| | | | | |
|---|---|---|---|---|
| 2012/0154670 A1* | 6/2012 | Hamamura | .......... | H04N 13/296 |
| | | | | 348/E5.045 |
| 2022/0345642 A1 | 10/2022 | Nakagawa | | |
| 2022/0385828 A1 | 12/2022 | Okuwaki | | |
| 2022/0385877 A1 | 12/2022 | Kimata | | |
| 2024/0205534 A1 | 6/2024 | Okuwaki | | |
| 2024/0414436 A1* | 12/2024 | Kitsunai | ................ | H04N 23/67 |

(Continued)

FOREIGN PATENT DOCUMENTS

| | | |
|---|---|---|
| EP | 4099681 A1 | 12/2022 |
| JP | 2004-356775 A | 12/2004 |
| JP | 2012-015620 A | 1/2012 |

OTHER PUBLICATIONS

Feb. 26, 2025 European Official Action in European Patent Appln. No. 24206100.0.

*Primary Examiner* — Shahbaz Nazrul
(74) *Attorney, Agent, or Firm* — Venable LLP

(57) ABSTRACT

An image capturing apparatus includes an image capturing device configured to photoelectrically convert a first optical image formed by a first imaging optical system, and configured to also photoelectrically convert a second optical image formed by a second imaging optical system arranged in parallel with the first optical system, a calculating unit configured to calculate a three-dimensional range, which is a range of a subject distance of the image capturing device in which a three-dimensional image looks three-dimensional, and a control unit configured to control the first imaging optical system and the second imaging optical system to limit a range of a subject distance in which automatic focusing of the first imaging optical system and the second imaging optical system is performed to within the three-dimensional range and perform automatic focusing.

27 Claims, 22 Drawing Sheets

(56) References Cited

U.S. PATENT DOCUMENTS

2025/0080841 A1* 3/2025 Kawarada .............. H04N 23/64
2025/0088735 A1* 3/2025 Inagaki ................ H04N 23/667
2025/0142212 A1* 5/2025 Yokoo .................. H04N 23/635
2025/0324159 A1* 10/2025 Mizuno ................ H04N 23/672

* cited by examiner

F I G. 1A
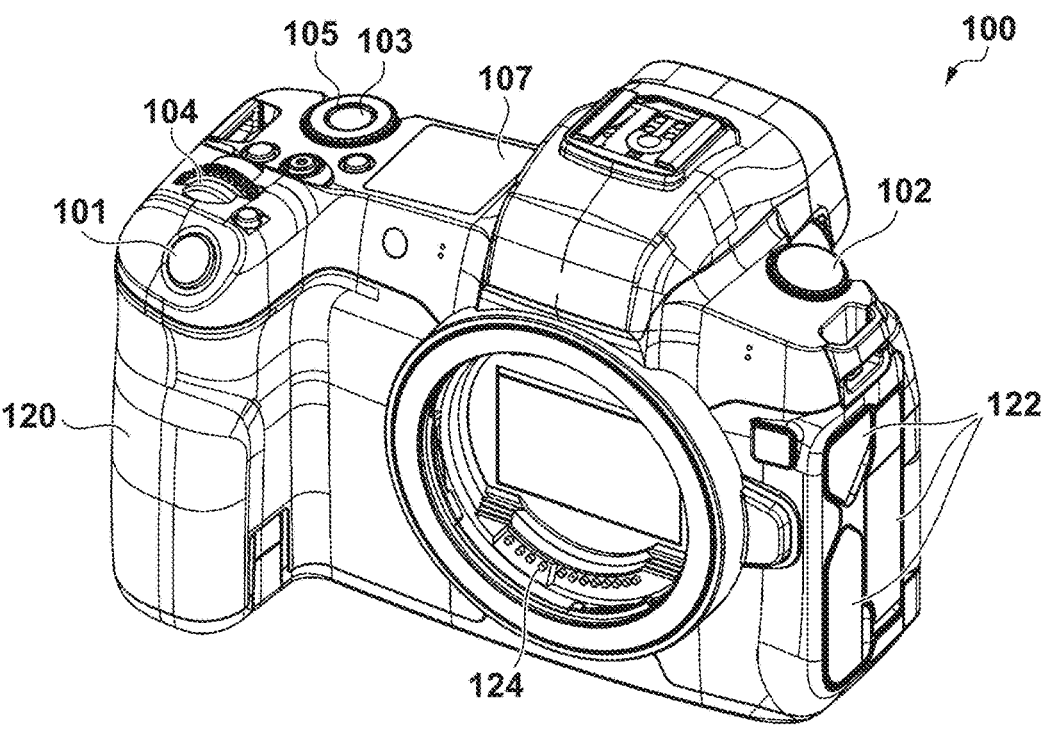
F I G. 1B
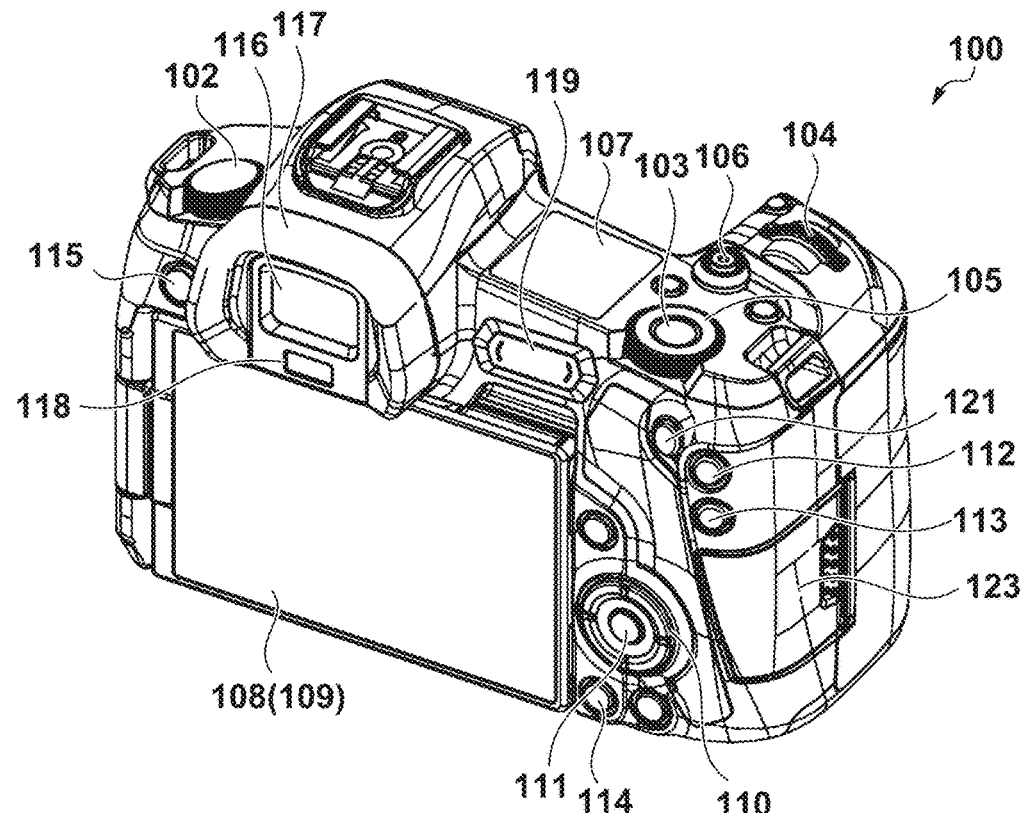

F I G. 4
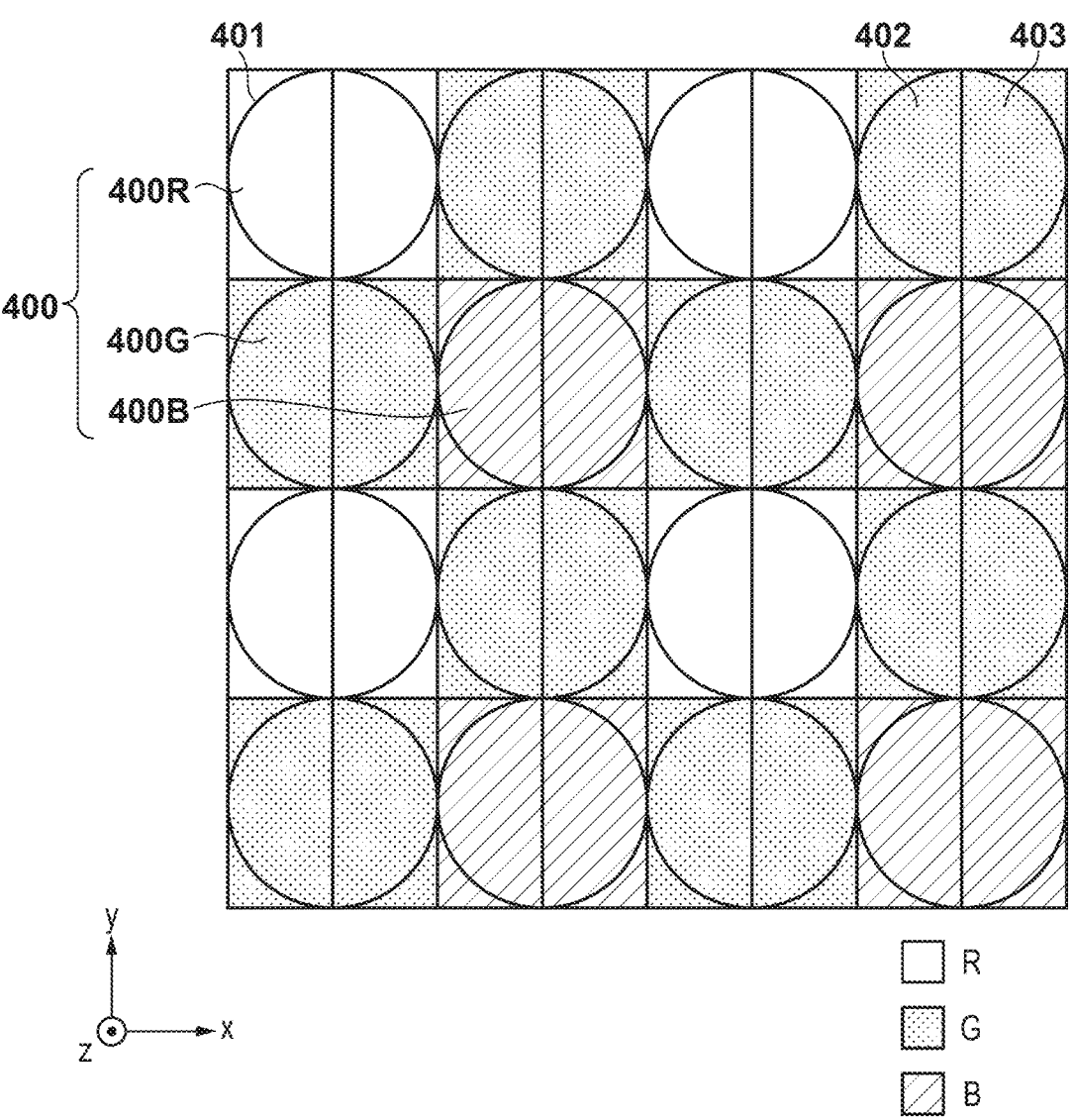

F I G. 7
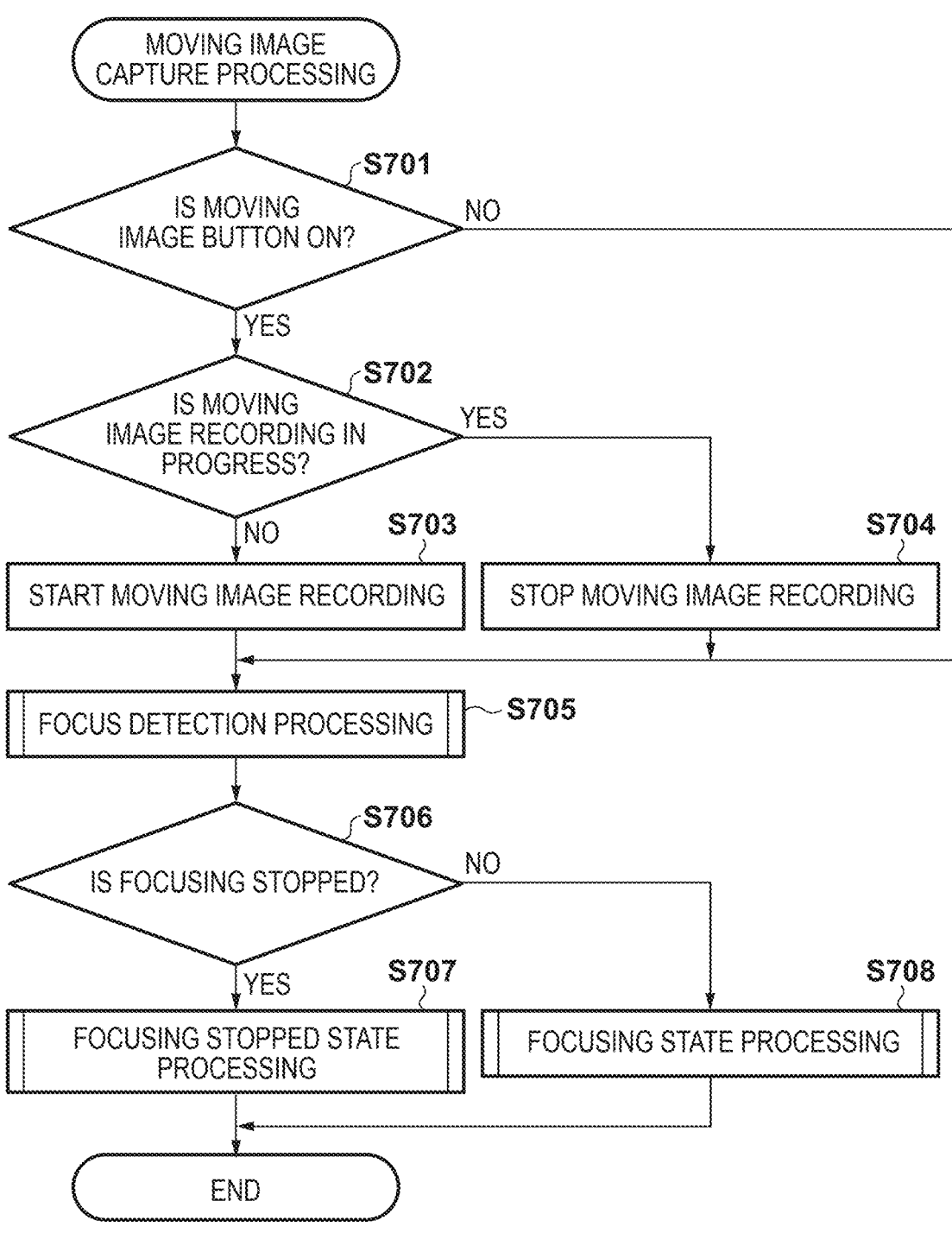

F I G. 9
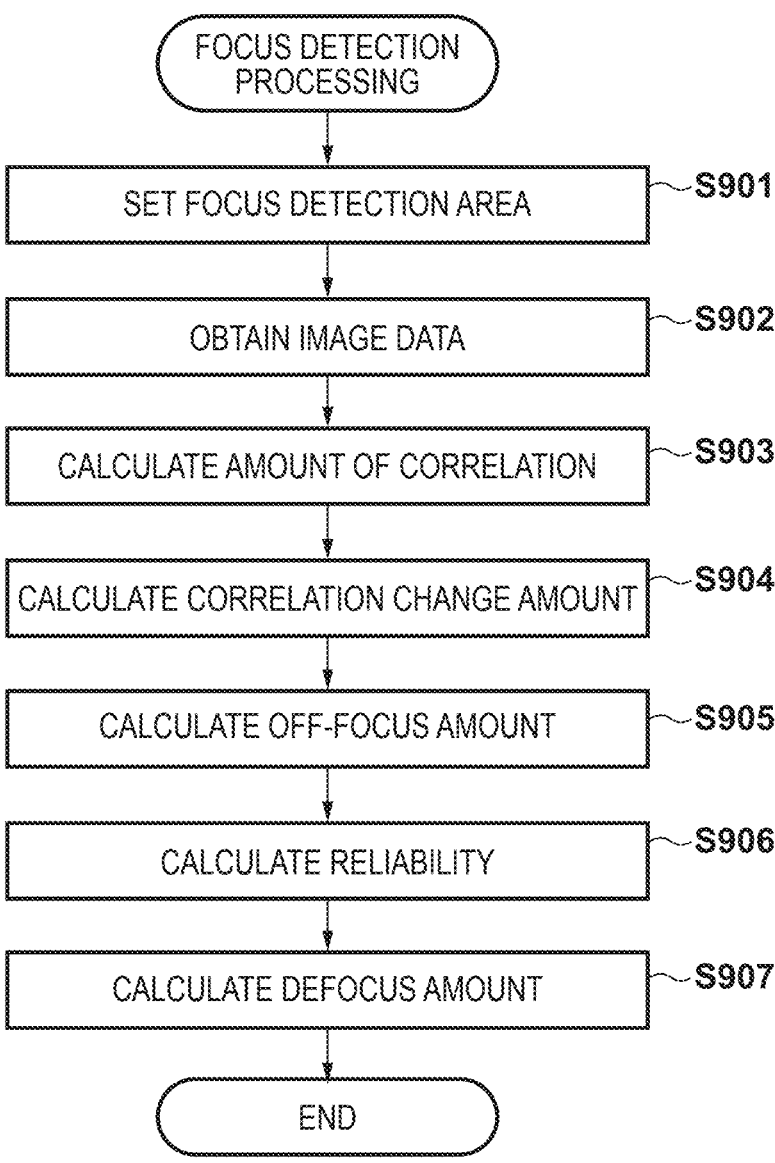
FOCUS DETECTION PROCESSING
SET FOCUS DETECTION AREA — S901
OBTAIN IMAGE DATA — S902
CALCULATE AMOUNT OF CORRELATION — S903
CALCULATE CORRELATION CHANGE AMOUNT — S904
CALCULATE OFF-FOCUS AMOUNT — S905
CALCULATE RELIABILITY — S906
CALCULATE DEFOCUS AMOUNT — S907
END

F I G. 11
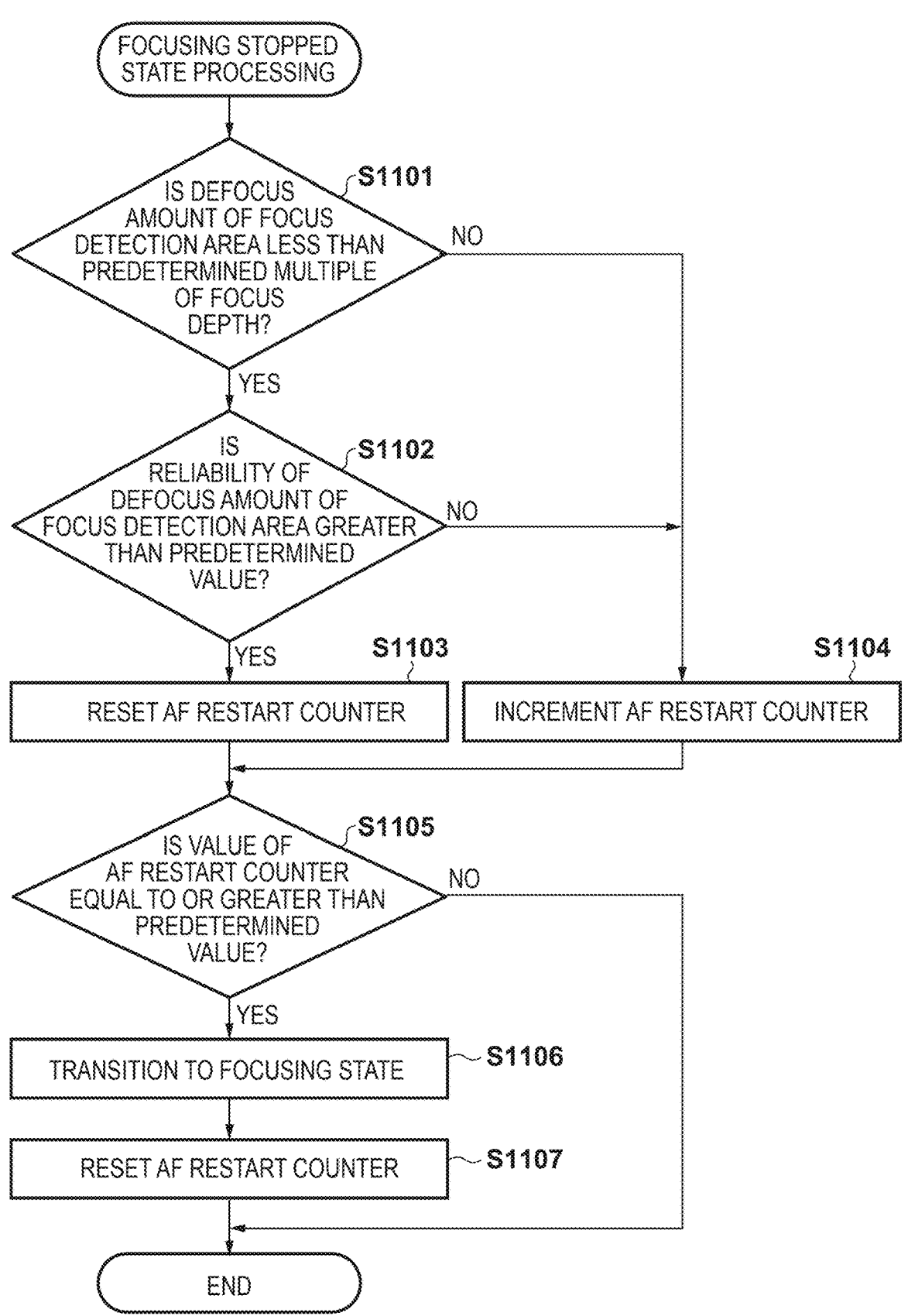

F I G. 12
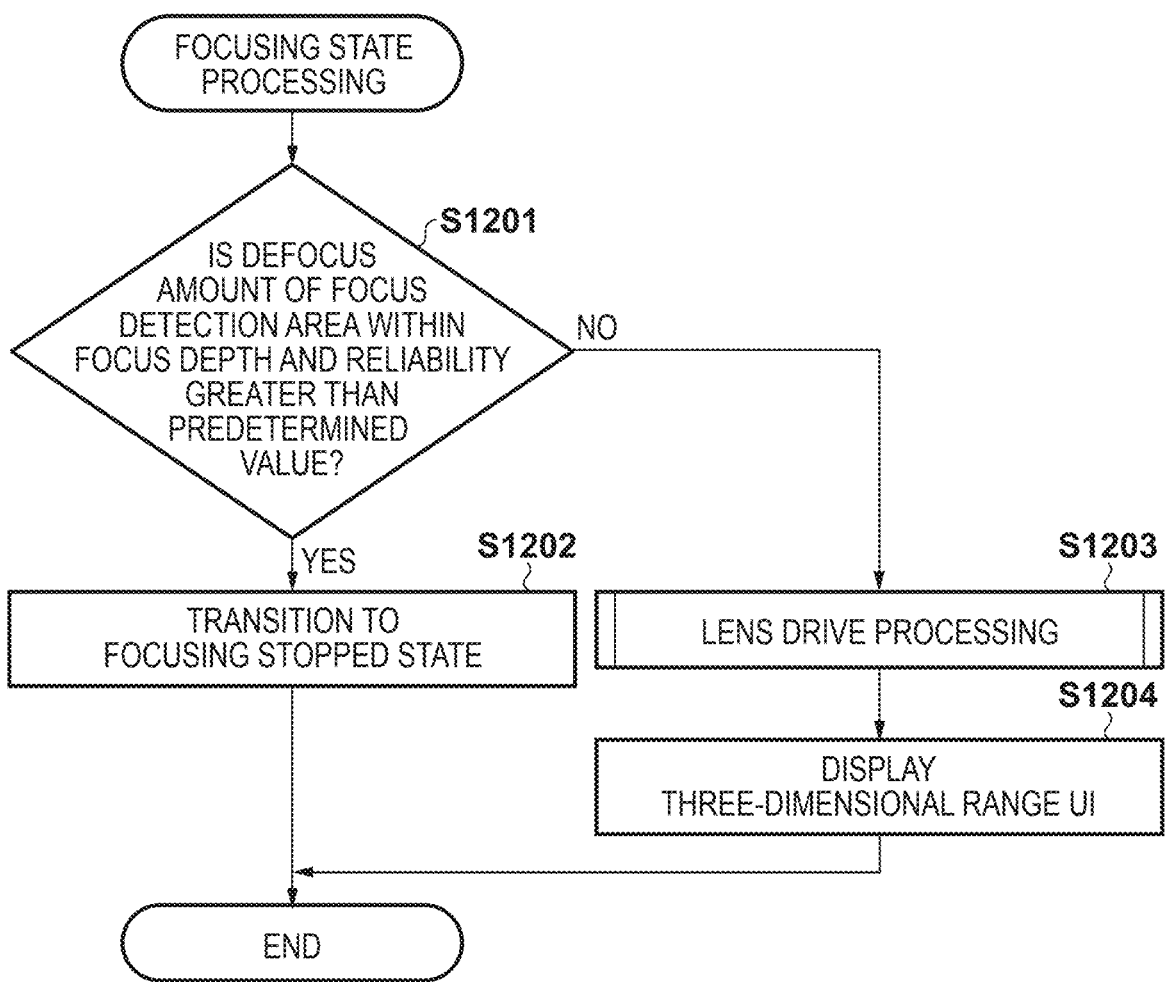

F I G. 14
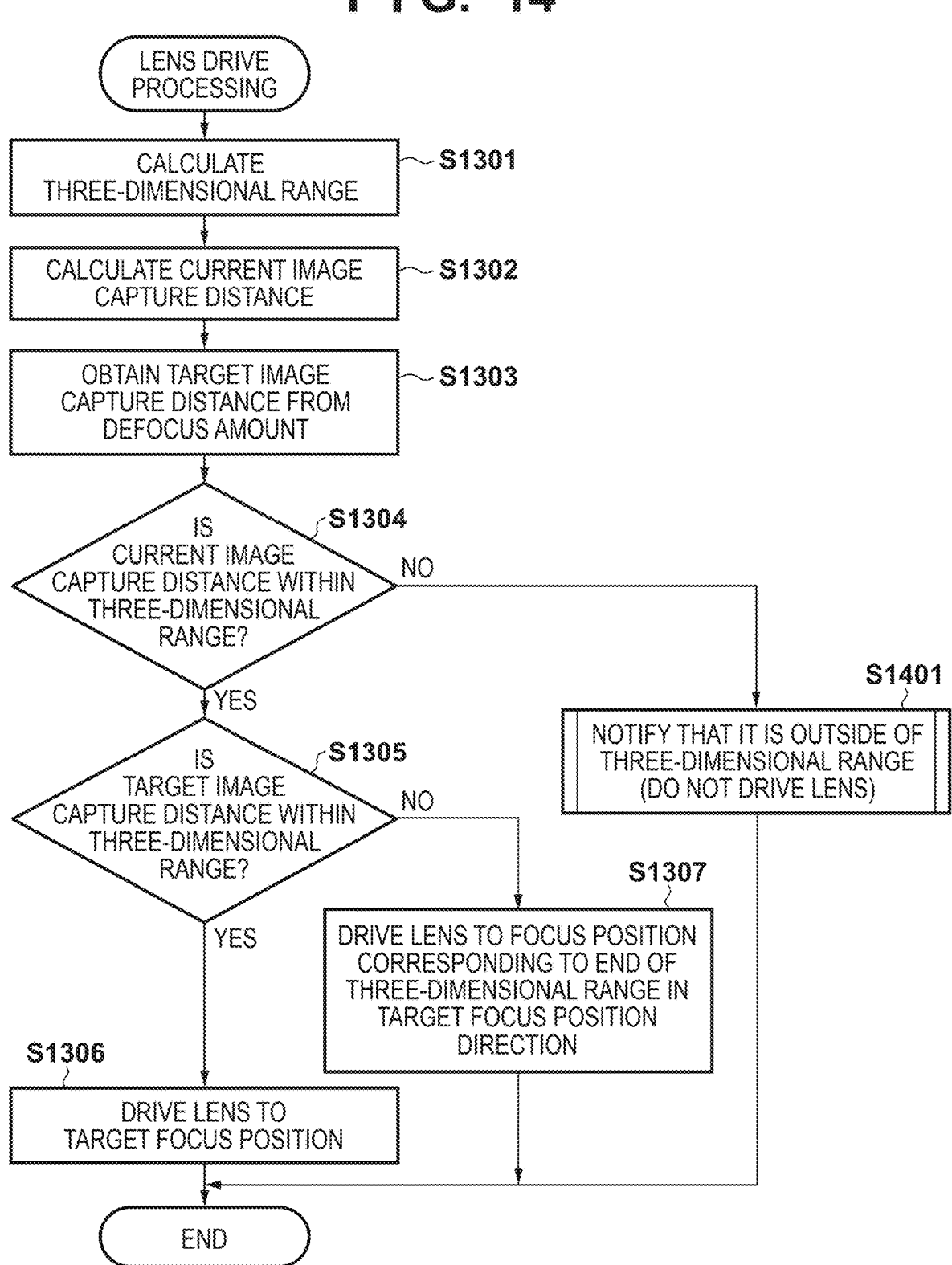

F I G. 17
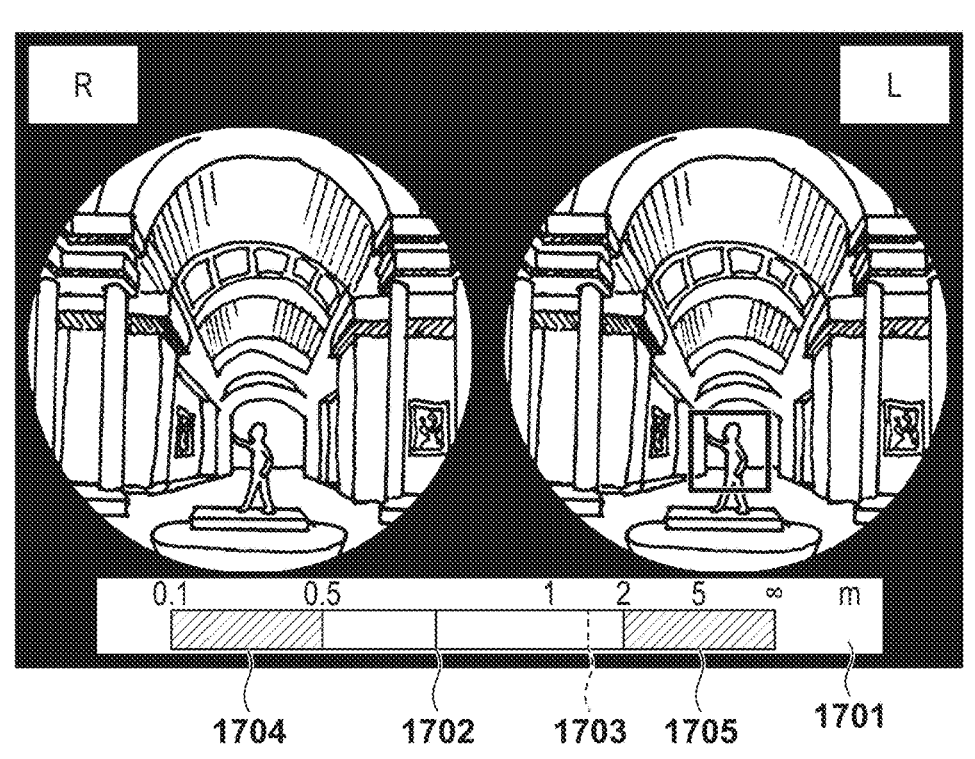
1704     1702     1703   1705     1701
<IMAGE CAPTURE DISTANCE INFORMATION DISPLAY>
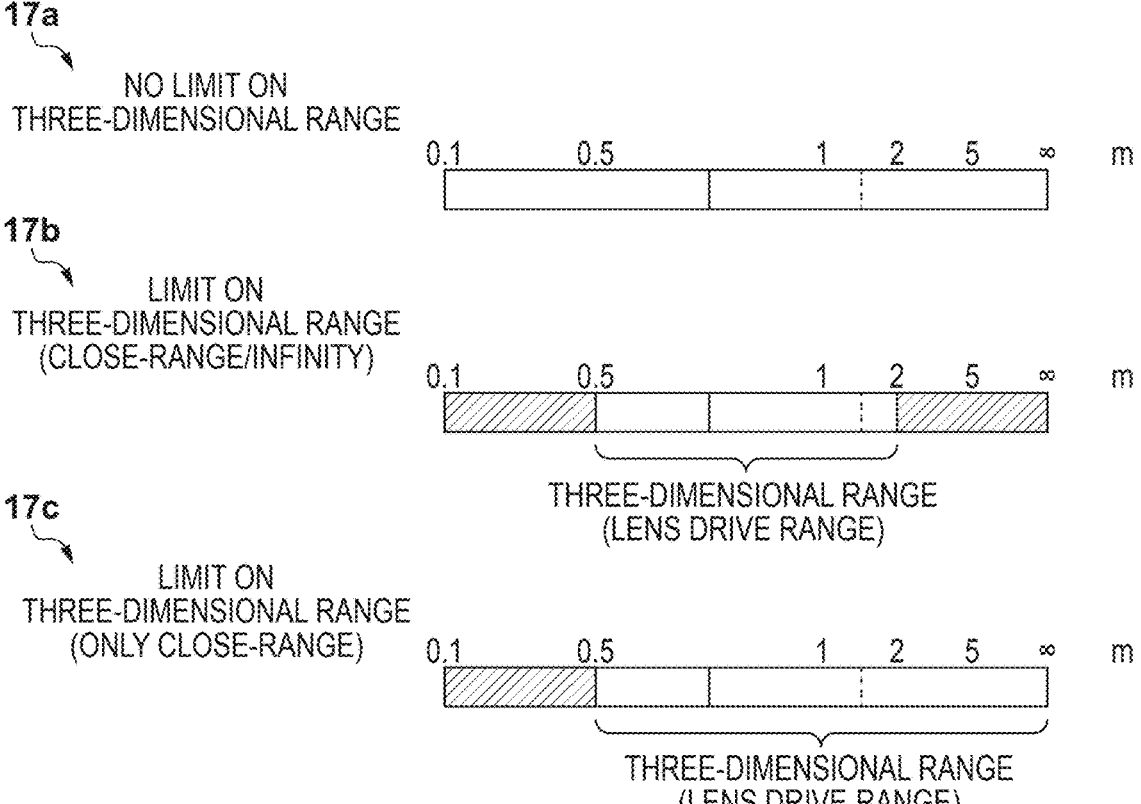
17a    NO LIMIT ON THREE-DIMENSIONAL RANGE
17b    LIMIT ON THREE-DIMENSIONAL RANGE (CLOSE-RANGE/INFINITY)
THREE-DIMENSIONAL RANGE (LENS DRIVE RANGE)
17c    LIMIT ON THREE-DIMENSIONAL RANGE (ONLY CLOSE-RANGE)
THREE-DIMENSIONAL RANGE (LENS DRIVE RANGE)

F I G. 18
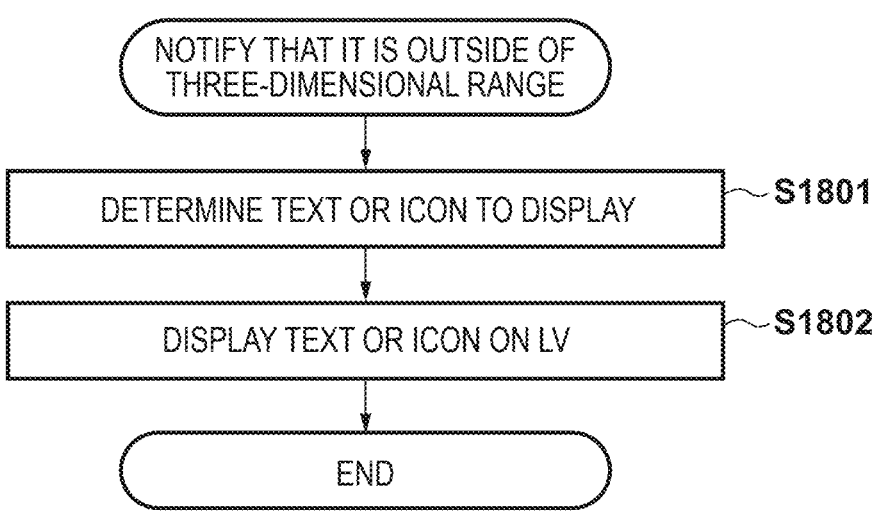

F I G. 20
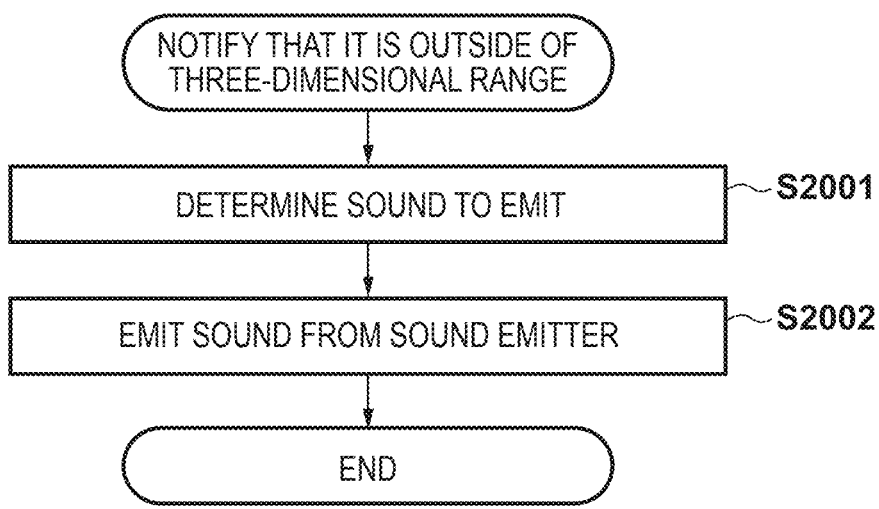
F I G. 21
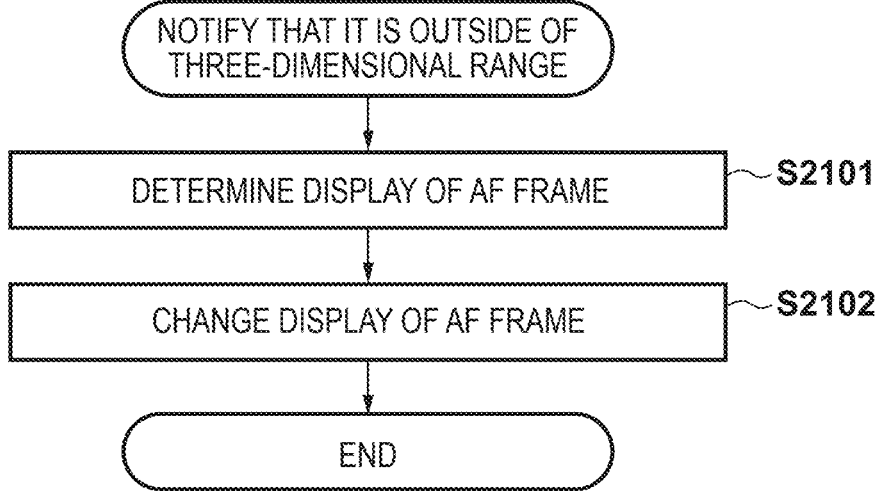

F I G.  22A
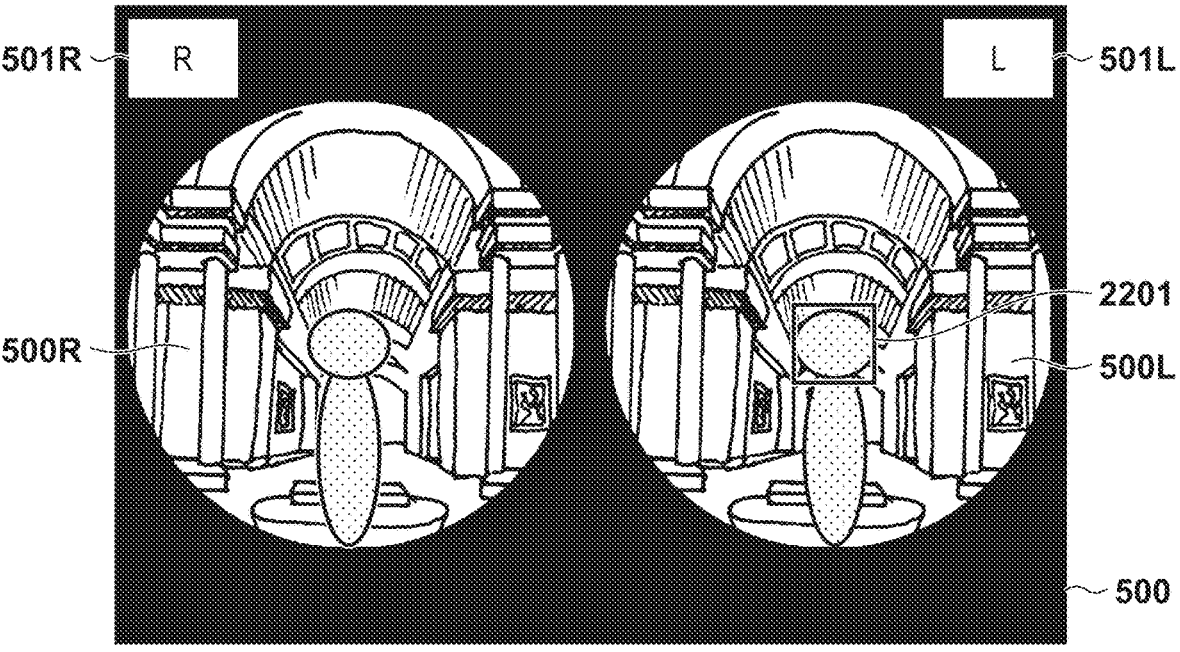
F I G.  22B
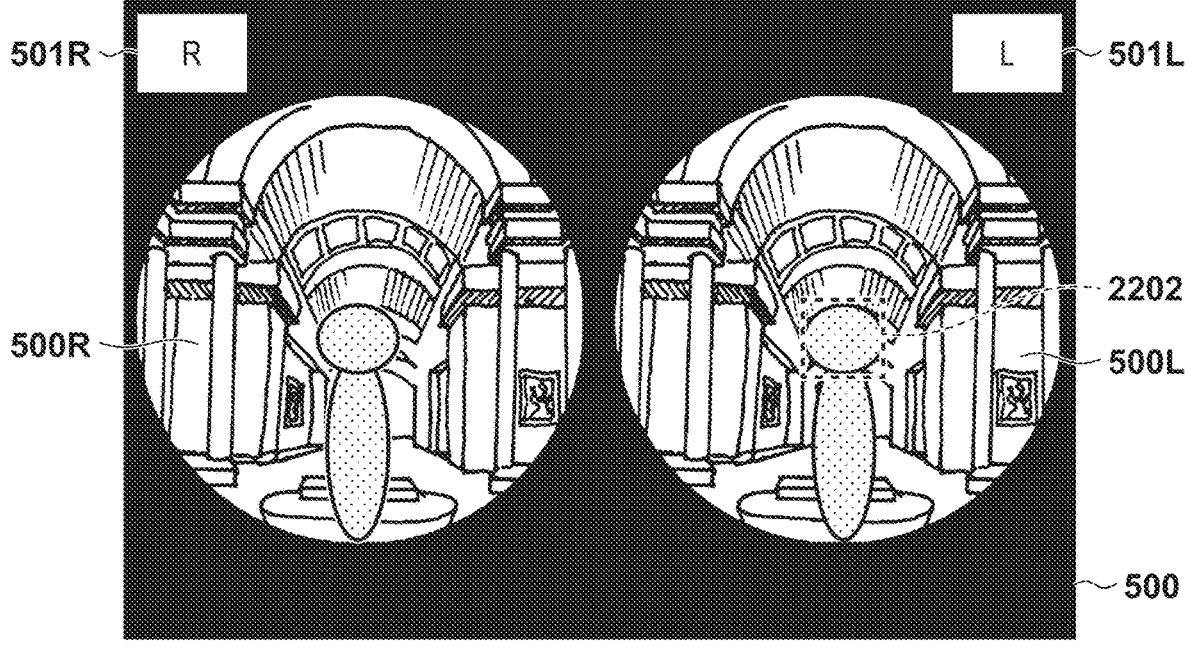

F I G. 23
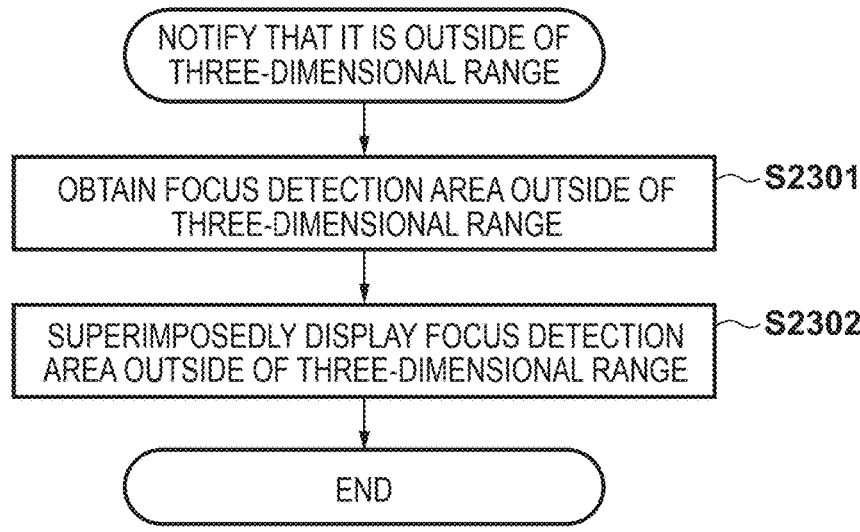
F I G. 24
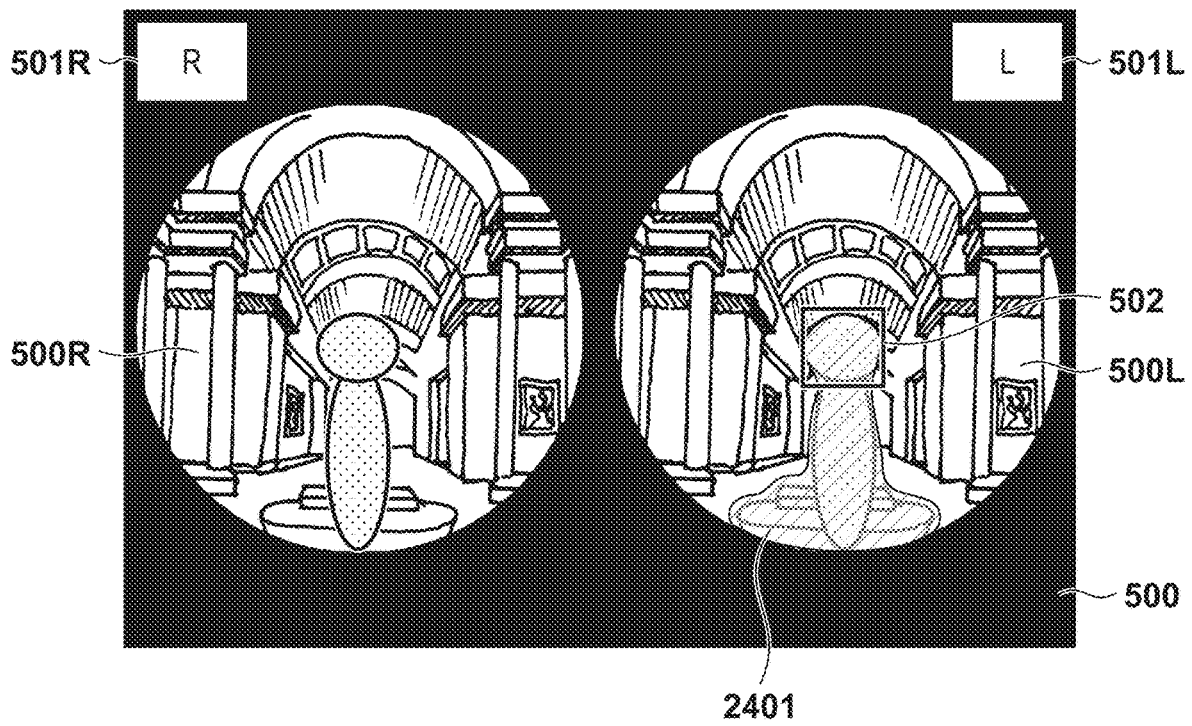

IMAGE CAPTURING APPARATUS, CONTROL METHOD THEREFOR, AND STORAGE MEDIUM

BACKGROUND OF THE INVENTION

Field of the Invention

The present invention relates to an image capturing apparatus that captures three-dimensional images.

Description of the Related Art

Known technology for displaying stereoscopic virtual reality (VR) images uses two optical systems to obtain wide angle of view images with parallax and maps these images on a virtual sphere for display. A dual lens VR camera for capturing images with parallax includes two optical systems facing the same direction and can obtain two images with parallax via a single image capture.

In the dual lens VR camera, each optical system can capture an image of a wide range that is at least 180° vertically and horizontally (a hemisphere: 90° in all directions from the center of the image). Also, known methods for displaying VR images include a "single lens VR display", which performs modification to map a VR image on a virtual sphere and displays one image; and "dual lens VR display", which displays VR images for a left eye and for a right eye side by side in left and right regions.

However, it is known that, regarding the distance to the subject at the time of VR image capture, there is a three-dimensional range that allows for comfortable stereoscopic viewing. In a case where the subject is closer than the three-dimensional range, the parallax of the subject increases, causing double vision of the image. Also, in a case where the subject is farther away than the three-dimensional range, the parallax decreases, causing the image to appear simply flat and thus losing the stereoscopic effect.

Various technologies have been proposed to solve this problem.

Japanese Patent Laid-Open No. 2004-356775 describes technology for obtaining an image for the left eye and an image for the right eye suitable for three-dimensional viewing that includes adjusting the distance between the optical axis of an imaging optical system of a left lens and the optical axis of an imaging optical system of a right lens on the basis of the distance to the subject measured by a rangefinder.

In Japanese Patent Laid-Open No. 2012-015620, the follow technology is described. An appropriate parallax range is calculated on the basis of the size of a display screen, a three-dimensional image is divided into a plurality of regions, and whether or not a parallax in each region is in the appropriate parallax range is determined. In a case where the parallax is not in the appropriate parallax range, a warning is display by an image display unit that displays three-dimensional images. If the parallax is not in the appropriate parallax range but the image of the region is blurry, a warning is not displayed. In this manner, the user can be made aware of a region with an inappropriate parallax at the time of three-dimensional image capture.

However, in Japanese Patent Laid-Open No. 2004-356775, an optimal left eye and right eye stereoscopic image cannot be obtained for a dual lens with a fixed distance between the optical axis of a left lens and a right lens.

In Japanese Patent Laid-Open No. 2012-015620, during VR moving image capture, if the parallax is not in the appropriate parallax range, only a warning is displayed, and the moving image is recorded as is.

SUMMARY OF THE INVENTION

The present invention has been made in light of the problems described above and enables realization of an image capturing apparatus that can capture images with an appropriate three-dimensional effect.

According to a first aspect of the present invention, there is provided an image capturing apparatus, comprising: an image capturing device configured to photoelectrically convert a first optical image formed by a first imaging optical system to output a first image, and configured to also photoelectrically convert a second optical image formed by a second imaging optical system arranged in parallel with the first optical system to output a second image; and at least one processor or circuit configured to function as: a calculating unit configured to, when the first image and the second image are displayed on a display apparatus, calculate a three-dimensional range, which is a range of a subject distance of the image capturing device in which a three-dimensional image looks three-dimensional; and a control unit configured to control the first imaging optical system and the second imaging optical system to limit a range of a subject distance in which automatic focusing of the first imaging optical system and the second imaging optical system is performed to within the three-dimensional range and perform automatic focusing.

A second aspect of the present invention, there is provided a method for controlling an image capturing apparatus including an image capturing device configured to photoelectrically convert a first optical image formed by a first imaging optical system to output a first image, and configured to also photoelectrically convert a second optical image formed by a second imaging optical system arranged in parallel with the first optical system to output a second image, the method comprising: when the first image and the second image are displayed on a display apparatus, calculating a three-dimensional range, which is a range of a subject distance of the image capturing means in which a three-dimensional image looks three-dimensional; and controlling the first imaging optical system and the second imaging optical system to limit a range of a subject distance in which automatic focusing of the first imaging optical system and the second imaging optical system is performed to within the three-dimensional range and perform automatic focusing.

Further features of the present invention will become apparent from the following description of exemplary embodiments with reference to the attached drawings.

BRIEF DESCRIPTION OF THE DRAWINGS

FIGS. 1A and 1B are diagrams illustrating an example of the external appearance configuration of a camera.

FIG. 4 is a schematic view illustrating an example of a pixel array of an image sensor inside an imaging unit.

FIG. 7 is a flowchart illustrating moving image capture processing.

FIG. 9 is a flowchart illustrating Example 1 of focus detection processing.

FIG. 11 is a flowchart illustrating focusing stopped state processing.

FIG. 12 is a flowchart illustrating focusing state processing.

FIG. 14 is a flowchart illustrating Example 2 of lens drive processing.

FIG. 17 is a diagram illustrating a display example of a three-dimensional range displayed in a live view image.

FIG. 18 is a flowchart illustrating Example 1 of outside three-dimensional range warning.

FIG. 20 is a flowchart illustrating Example 2 of outside three-dimensional range warning.

FIG. 21 is a flowchart illustrating Example 3 of outside three-dimensional range warning.

FIGS. 22A and 22B are diagrams illustrating examples of AF frame display according to Example 3 of outside three-dimensional range warning.

FIG. 23 is a flowchart illustrating Example 4 of outside three-dimensional range warning.

FIG. 24 is a diagram illustrating an example of superimpose display according to Example 4 of outside three-dimensional range warning.

DESCRIPTION OF THE EMBODIMENTS

Figure 2:
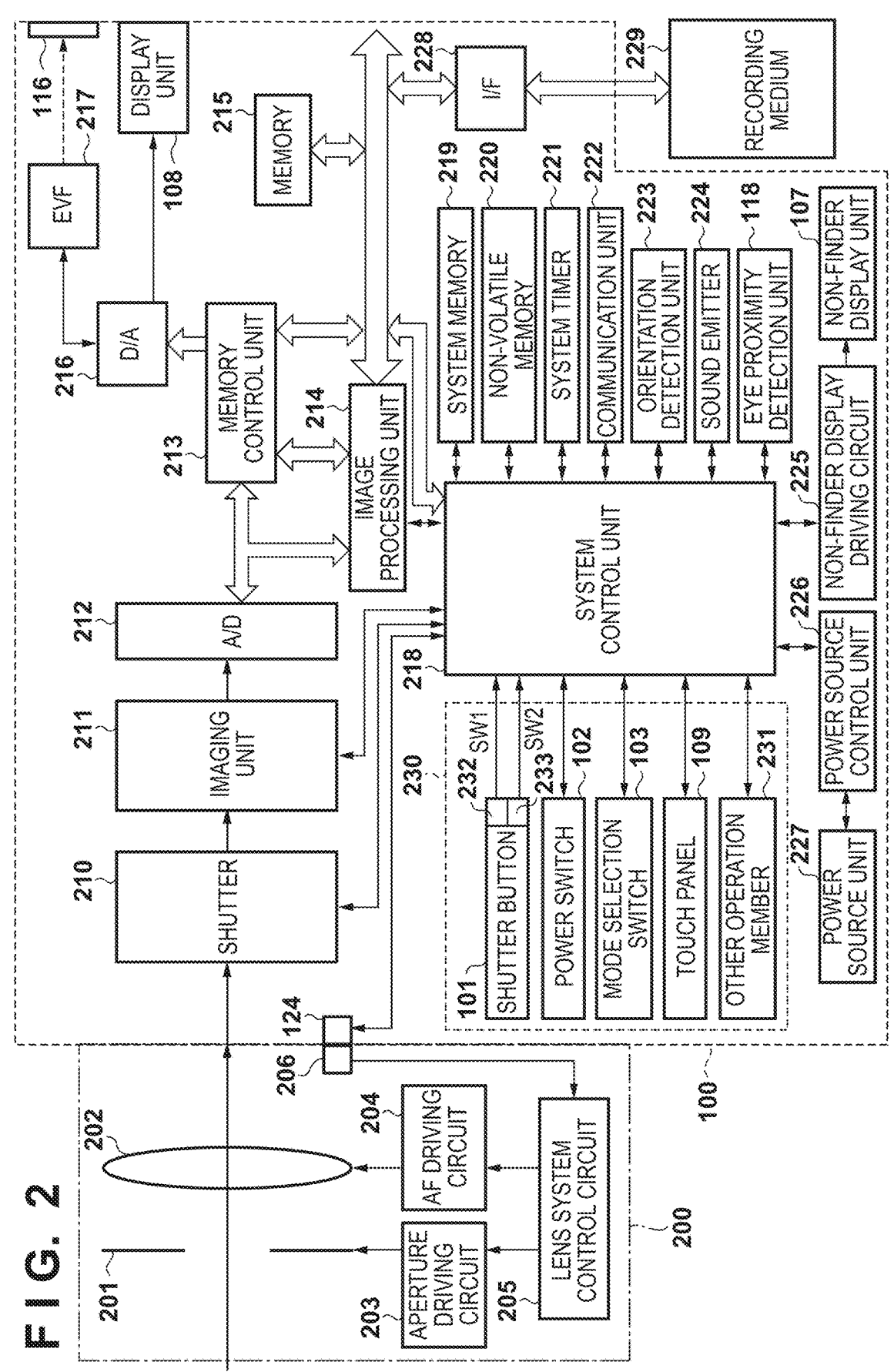
FIG. 2 is a diagram illustrating an example of the internal configuration of a camera when mounted with a single lens unit.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Camera External Appearance Configuration

FIGS. 1A and 1B are diagrams illustrating an example of the external appearance configuration of a digital camera 100 (hereinafter referred to as camera), which is an embodiment of an image capturing apparatus of the present invention. FIG. 1A is a perspective view of the camera 100 as seen from front, and FIG. 1B is a perspective view of the camera 100 as seen from the back.

The camera 100 includes, on its upper surface, a shutter button 101, a power switch 102, a mode selection switch 103, a main electronic dial 104, a sub-electronic dial 105, a moving image button 106, and a non-finder display unit 107. The shutter button 101 is an operation unit for performing image capturing preparations or image capturing instructions. The power switch 102 is an operation unit for switching the power source of the camera 100 on and off. The mode selection switch 103 is an operation unit for selecting various modes. The main electronic dial 104 is a rotational operation unit for changing a setting value such as the shutter speed, the aperture, and the like. The sub-electronic dial 105 is a rotational operation unit for moving a selection frame (cursor), image switching, and the like. The moving image button 106 is an operation unit for issues an instruction to start or stop moving image capture (recording). The non-finder display unit 107 displays various setting values such as the shutter speed, the aperture, and the like.

Also, the camera 100 includes, on its back surface, a display unit 108, a touch panel 109, a directional key 110, a SET button 111, an AE lock button 112, an AF frame select/magnify button 113, a reproduction button 114, a menu button 115, an eyepiece unit 116, an eye proximity detection unit 118, and a touch bar 119. The display unit 108 displays images and various types of information. The touch panel 109 is an operation unit that detects touch operations on the display surface (touch operation screen) of the display unit 108. The directional key 110 is an operation unit constituted of a key (four-directional key) that can be pressed up, down, left, and right. An operation according to the position pressed of the directional key 110 can be performed. The SET button 111 is an operation unit that is mainly pressed to determine a selected item. The AE lock button 112 is an operation unit that is pressed to fix the exposure state in the image capturing standby state. The AF frame select/magnify button 113 is a shared operation unit for selection operations to enable a movement operation of the AF frame and for switching the magnification mode on and off in the image capturing mode live view display (LV display). By operating the main electronic dial 104 when the magnification mode on, the live view image (LV image) is magnified or reduced. Also, the AF frame select/magnify button 113 is used when magnifying the reproduced image in reproduction mode, increasing the magnification ratio, and the like. The reproduction button 114 is an operation unit for switching between image capturing mode and reproduction mode. When the reproduction button 114 is pressed in image capturing mode, the mode transitions to the reproduction mode, and the latest images from among the images recorded in a recording medium 229 described below can be displayed on the display unit 108.

The menu button 115 is an operation unit that is pressed to display a menu screen where various settings can be set on the display unit 108. The user can use the menu screen displayed on the display unit 108, the directional key 110, and the SET button 111 to intuitively set various settings. The eyepiece unit 116 is the part which the eye approaches to look into the eyepiece finder 117 (look-in type finder). The user can look through the eyepiece unit 116 to see the images displayed on an internal electronic view finder (EVF) 217 described below. The eye proximity detection unit 118 is a sensor that detects whether or not the eye of the user is in proximity to the eyepiece unit 116.

The touch bar 119 is a line-shaped touch operation unit (line touch sensor) that can receive a touch operation. The touch bar 119 is disposed at a position where the touch bar 119 can be touch-operated (touchable) with the right thumb when a grip unit 120 is held with the right hand (held with the little finger, ring finger, and middle finger of the right hand) so that the shutter button 101 can be pressed with the right index finger. In other words, the touch bar 119 can be operated in a state where the shutter button 101 can be pressed at any time while the user brings their eye close to the eyepiece unit 116 and looks through the eyepiece finder 117. The touch bar 119 can receive a tap operation on the touch bar 119 (operation of touching and releasing without moving the touch position within a predetermined period), a slide operation to the left or right (operation of moving the touched position while maintaining the touched state), and the like. The touch bar 119 is an operation unit that is different from the touch panel 109 and does not include a display function. The touch bar 119 according to the present embodiment is a multi-function bar and functions as a M-Fn bar, for example.

Also, the camera 100 includes the grip unit 120, a thumb rest unit 121, a terminal cover 122, a cover 123, a communication terminal 124, and the like. The grip unit 120 is a holding unit formed in a shape that is easy to grip with the right hand when the user holds the camera 100. The shutter button 101 and the main electronic dial 104 are disposed at a position allowing for operation using the index finger of the right hand, when the camera 100 is held by gripping the grip unit 120 with the little finger, the ring finger, and the middle finger of the right hand. Also, the sub-electronic dial 105 and the touch bar 119 are disposed at a position allowing for operation by the thumb of the right hand when in a similar state. The thumb rest unit 121 (thumb standby position) is a grip unit provided on the back surface of the camera 100 at a position where the thumb of the right hand gripping the grip unit 120 can rest easily when no operation units are being operated. The thumb rest unit 121 is constituted by a rubber member for increasing the holding force (grip effect). The terminal cover 122 protects the connection cable and similar connectors that connect the camera 100 to an external device. The cover 123 protects the recording medium 229 and the slot by closing the slot that houses the recording medium 229 described below. The communication terminal 124 is a terminal for communication with a lens unit 200 described below that can be detachably attached to the camera 100.

Camera Internal Configuration

FIG. 2 is a diagram illustrating an example of the internal configuration of the camera 100. Note that components that are the same as in FIGS. 1A and 1B are given the same reference sign and description thereof is omitted as appropriate. The lens unit 200 is mounted in the camera 100.

First, the lens unit 200 will be described.

The lens unit 200 is a type of interchangeable lens that is detachably attached to the camera 100. The lens unit 200 is a single lens and is an example of a typical lens.

The lens unit 200 includes an aperture 201, a lens 202, an aperture driving circuit 203, an autofocus (AF) driving circuit 204, a lens system control circuit 205, a communication terminal 206, and the like.

The aperture 201 is configured with an adjustable opening diameter. The lens 202 is constituted of a plurality of lenses. The aperture driving circuit 203 adjusts the amount of light by controlling the opening diameter of the aperture 201. The AF driving circuit 204 drives the lens 202 to perform focusing. The lens system control circuit 205 controls the aperture driving circuit 203, the AF driving circuit 204, and the like on the basis of instructions from a system control unit 218 described below. The lens system control circuit 205 controls the aperture 201 via the aperture driving circuit 203 and changes the position of the lens 202 via the AF driving circuit 204 to perform focusing. The lens system control circuit 205 can communicate with the camera 100. Specifically, the communication terminal 206 of the lens unit 200 communicates with camera 100 with the communication terminal 124. The communication terminal 206 is a terminal for the lens unit 200 to communicate with the camera 100 side.

Next, the camera 100 will be described.

The camera 100 includes a shutter 210, an imaging unit 211, and A/D converter 212, a memory control unit 213, an image processing unit 214, a memory 215, a D/A converter 216, an EVF 217, the display unit 108, and the system control unit 218.

The shutter 210 is a focal plane shutter that can freely control the exposure time of the imaging unit 211 on the basis of instructions from the system control unit 218. The imaging unit 211 is provided with an image sensor constituted by a CCD, a CMOS element, and the like for converting an optical image into an electrical signal. The imaging unit 211 may include an image plane phase detection sensor that outputs defocus amount information to the system control unit 218. The A/D converter 212 converts an analog signal output from the imaging unit 211 into a digital signal. The image processing unit 214 executes predetermined processing (pixel interpolation, resizing processing such as reduction, color conversion processing, and the like) on data from the A/D converter 212 or data from the memory control unit 213. Also, the image processing unit 214 executes predetermined arithmetic processing using the captured image data, and the system control unit 218 performs exposure control and distance measuring control on the basis of the obtained arithmetic operation result. Via this processing, a through-the-lens (TTL) type automatic focusing (AF) processing, automatic exposure (AE) processing, pre-flash emission (EF) processing, and the like are executed. Also, the image processing unit 214 executes predetermined arithmetic processing using the captured image data and TTL type auto white balance (AWB) on the basis of the obtained arithmetic operation result.

The image data from the A/D converter 212 is written to the memory 215 via the image processing unit 214 or the memory control unit 213. Alternatively, the image data from the A/D converter 212 is written to the memory 215 via memory control unit 213 bypassing the image processing unit 214. The memory 215 stores image data obtained by the imaging unit 211 and converted into digital data by the A/D converter 212, image data for display on the display unit 108 or the EVF 217, and the like. The memory 215 is provided with enough storage capacity to store a predetermined number of still images, video and audio of a predetermined amount of time, and the like. Also, the memory 215 also functions as memory (video memory) for image display.

A D/A converter 216 converts data for image display stored in the memory 215 into an analog signal and supplies the analog signal to the display unit 108 or the EVF 217. In this manner, the image data for display written to the memory 215 is displayed on the display unit 108 or the EVF 217 via the D/A converter 216. The display unit 108 or the EVF 217 performs display corresponding to the analog signal from the D/A converter 216. The display unit 108 and the EVF 217 are an LCD, organic EL, or similar display, for example. By using the D/A converter 216 to convert the digital signals obtained via A/D conversion by the A/D converter 212 and accumulated in the memory 215 into analog signals and successively transferring and displaying the signals on the display unit 108 or the EVF 217, live view display is performed.

The system control unit 218 is a control unit including at least one processor and/or at least one circuit. In other words, the system control unit 218 may be a processor, a circuit, or a combination of a processor and a circuit. The system control unit 218 controls the entire camera 100. The processing of the flowchart described below is implemented by the system control unit 218 executing the programs stored in a non-volatile memory 220. Also, the system control unit 218 controls the memory 215, the D/A converter 216, the display unit 108, the EVF 217, and the like to perform display control.

Also, the camera 100 includes a system memory 219, the non-volatile memory 220, a system timer 221, a communication unit 222, an orientation detection unit 223, and the eye proximity detection unit 118.

The system memory 219 uses RAM, for example. Constants and variables for operation of the system control unit 218 and programs read out from the non-volatile memory 220 are loaded on the system memory 219. The non-volatile memory 220 is a memory which is electrically erasable and recordable, and EEPROM may be used, for example. Constants, programs, and the like for operation of the system control unit 218 are stored in the non-volatile memory 220. Herein, a program refers to a program for executing the flowchart described below.

The system timer 221 is a time measuring unit that measures the time used by the various controls, the time of a built-in timer, and the like. The communication unit 222 exchanges image signals, and audio signals with an external device connected wirelessly or with a wired cable. The communication unit 222 can connect to a wireless local area network (LAN) and the Internet. Also, the communication unit 222 can communicate with an external device via Bluetooth (registered trademark) or Bluetooth Low Energy. The communication unit 222 can transmit images (including a live image) captured by the imaging unit 211 and images recorded on the recording medium 229 and receive image data and various other types of information from an external device.

The orientation detection unit 223 detects the orientation of the camera 100 with respect to the direction of gravity. Whether an image captured by the imaging unit 211 is an image taken by the camera 100 in landscape or portrait can be determined on the basis of the orientation detected by the orientation detection unit 223. The system control unit 218 can add orientation information based on the orientation detected by the orientation detection unit 223 to an image file of an image captured by the imaging unit 211, or rotate and record the image. The orientation detection unit 223 can use an acceleration sensor, a gyro sensor, or the like, for example. The motion of the camera 100 (such as a pan, tilt, lift-up, and whether the digital camera 100 is at rest) can also be detected by using the orientation detection unit 223.

A sound emitter 224 can output a sound via a command from the system control unit 218. For example, an effect sound when operated, an AF focused state notification sound, audio from a captured moving image, and the like may be emitted.

The eye proximity detection unit 118 can detect a certain object in proximity to the eyepiece unit 116 of the eyepiece finder 117 including the built-in EVF 217. The eye proximity detection unit 118 can use an infrared proximity sensor, for example. When an object is in proximity, infrared light from a light projecting unit of the eye proximity detection unit 118 is reflected by the object and received by a light-receiving unit of the infrared proximity sensor. The distance from the eyepiece unit 116 to the object can be determined using the amount of received infrared light. In this manner, the eye proximity detection unit 118 detects eye proximity by detecting the proximity distance of the object with respect to the eyepiece unit 116. The eye proximity detection unit 118 is an eye proximity detection sensor that detects approaching (eye proximity) and receding (eye receding) of an eye (object) with respect to the eyepiece unit 116 of the eyepiece finder 117. In the case where, in the non-eye approach state (non-proximity state), an object is detected near the eyepiece unit 116 within a predetermined distance, eye proximity is detected. In a case where, in the eye approaching state (proximity state), an object detected as in proximity moves away a predetermined distance or greater, eye separation is detected. The threshold for detecting eye proximity and the threshold for detecting eye separation may be made different by providing a hysteresis or the like, for example. The state from when eye proximity is detected until eye separation is detected is determined as the eye proximity state. The state from when eye separation is detected until eye proximity is detected is determined as the non-eye proximity state.

The system control unit 218 switches between display (display state) and non-display (non-display state) of the display unit 108 and the EVF 217 according to the state detected by the eye proximity detection unit 118. Specifically, in a case where at least the image capturing standby state is active and display destination switching is set to automatic, when the eye is not in proximity, the display destination is set as the display unit 108 and display is turned on and the EVF 217 is set to non-display. Also, when the eye is in proximity, the display destination is set to the EVF 217 and display is turned on and the display unit 108 is set to non-display. Note that the eye proximity detection unit 118 is not limited to an infrared proximity sensor and may use another sensor as long as it can detect the state defined as eye proximity.

Also, the camera 100 includes the non-finder display unit 107, a non-finder display driving circuit 225, a power source control unit 226, a power source unit 227, a recording medium I/F 228, an operation unit 230, and the like.

The non-finder display unit 107 displays various setting values of the camera 100 including the shutter speed, the aperture, and the like via the non-finder display driving circuit 225. The power source control unit 226 includes a battery detection circuit, a DC-DC converter, and a switch circuit for switching blocks to be energized and detects whether a battery is installed, the type of battery, and the remaining battery level. Also, the power source control unit 226 controls the DC-DC converter on the basis of the detection results and an instruction from the system control unit 218 and supplies the required voltages to various components including the recording medium 229 at the required time. The power source unit 227 includes a primary battery, such as an alkaline battery and a lithium battery, a secondary battery such as a nickel-cadmium (NiCd) battery, a nickel metal halide (NiMH) battery, and a lithium-ion (Li) battery, and/or an alternating current (AC) adapter. The recording medium I/F 228 is an interface with the recording medium 229, such as a memory card or a hard disk. The recording medium 229 is a memory card or the like for recording capture images and is constituted of a semiconductor memory, a magnetic disk, or the like. The recording medium 229 may be detachable or may be built-in.

The operation unit 230 is an input unit that receives operations from a user (user operations) and is used to input various types of instructions to the system control unit 218. The operation unit 230 includes the shutter button 101, the power switch 102, the mode selection switch 103, the touch panel 109, and other operation members 231, and the like. The other operation members 231 include the main electronic dial 104, the sub-electronic dial 105, the moving image button 106, the directional key 110, the SET button 111, the AE lock button 112, the AF frame select/magnify button 113, the reproduction button 114, the menu button 115, the touch bar 119, and the like.

The shutter button 101 includes a first shutter switch 232 and a second shutter switch 233. The first shutter switch 232 turns on halfway through the operation of the shutter button 101, or in other words when half pressed (an image capture preparation instruction), and generates a first shutter switch signal SW1. The system control unit 218 starts AF process-ing, AE processing, AWB processing, EF processing, and similar image capturing preparation processing in response to the first shutter switch signal SW1. The second shutter switch 233 turns on when the operation of the shutter button 101 is completed, or in other words when fully pressed (image capture instruction), and generates a second shutter switch signal SW2. In response to the second shutter switch signal SW2, the system control unit 218 starts a series of image capture processing operations from reading out a signal from the imaging unit 211 to generating an image file including the captured image and writing it to the recording medium 229.

The mode selection switch 103 switches the operation mode of the system control unit 218 to any one of a still image capturing mode, a video capturing mode, a reproduc-tion mode, or the like. Modes included in the still image capturing mode are an automatic image capturing mode, an automatic scene determination mode, a manual mode, an aperture priority mode (Av mode), a shutter speed priority mode (Tv mode), and a program AE mode (P mode). Also, various types of scene modes, which include image captur-ing settings specific to respective image capture scenes, and custom modes are also included. The user can directly switch to any of the image capturing modes described above via the mode selection switch 103. Alternatively, after the user switches to a screen listing the image capturing modes via the mode selection switch 103, the user can selectively switch to any of the displayed plurality of modes via the operation unit 230. In a similar manner, the video capturing mode may include a plurality of modes.

The touch panel 109 is a touch sensor that detects various types of touch operations on the display surface (operation surface of the touch panel 109) of the display unit 108. The touch panel 109 and the display unit 108 can be integrally formed. For example, the touch panel 109 is set to have light transmittance that does not obstruct the display of the display unit 108 and is attached to the upper layer of the display surface of the display unit 108. Also, by associating together the input coordinates of the touch panel 109 and the display coordinates on the display surface of the display unit 108, a graphical user interface (GUI) can be configured that allows the user to directly operate the screen displayed on the display unit 108. For the touch panel 109, various method types may be used, such as a resistive film type, an electrostatic capacitance type, a surface acoustic wave type, an infrared type, an electromagnetic induction type, an image recognition type, and an optical sensor type. Depend-ing on the method, a touch is detected in a case where the touch panel 109 is touched, or a touch is detected in a case where a finger or stylus pen approaches the touch panel 109, but either method may be employed.

The system control unit 218 can detect the following operations and state with respect to the touch panel 109.

A finger or stylus pen that has not touched the touch panel 109 newly touching the touch panel 109, or in other words, the start of a touch (hereinafter referred to as a touch-down).

A state of the finger or stylus pen touching the touch panel 109 (hereinafter referred to as a touch-on).

A state of the finger or stylus pen moving while touching the touch panel 109 (hereinafter referred to as a touch-move).

A finger or stylus pen that was touching the touch panel 109 separating (releasing) from the touch panel 109, or in other words, the end of a touch (hereinafter referred to as a touch-up).

A state of nothing touching the touch panel 109 (herein-after referred to as a touch-off).

When a touch-down is detected, a touch-on may also be simultaneously detected. After, a touch-down, for as long as a touch-up is not detected, a touch-on is typically continu-ously detected. Also, in a case where a touch-move is detected, a touch-on is simultaneously detected. Even, if a touch-on has been detected, unless the touch position is moving, a touch-move is not detected. A touch-off correlates to after the detection of touch-up of all of the fingers and stylus pen that were touching.

These operations and state and positional coordinates where a finger or stylus pen is touching the touch panel 109 are communicated to the system control unit 218 via an internal bus. The system control unit 218 determines which operation (touch operation) was performed on the touch panel 109 on the basis of the communicated information. Regarding a touch-move, the movement direction of the finger or stylus pen moving on the touch panel 109 can be determined for each vertical component and horizontal component on the touch panel 109 on the basis of changes in the positional coordinates. In a case where a touch-move of a predetermined distance or greater is detected, it is determined that a slide operation has been performed. An operation where a finger, while touching the touch panel 109, is quickly moved a certain distance and then released is referred to as a flick. In other words, a flick is an operation of quickly drawing a finger across the touch panel 109 then releasing. In a case where a touch-move of a predetermined distance or greater at a predetermined speed or greater is detected and then touch-up is detected, a flick may be determined to have been performed (it can be determined that a flick was performed after a slide operation). Further-more, a touch operation of touching (multi-touching) a plurality of points (e.g. two points) and moving these touch positions closer together is referred to as pinch-in, and a touch operation of moving these touch positions further apart is referred to as pinch-out. Pinch-out and pinch-in are collectively referred to as a pinch operation (or simply pinch).

Lens Unit Configuration

Figure 3:
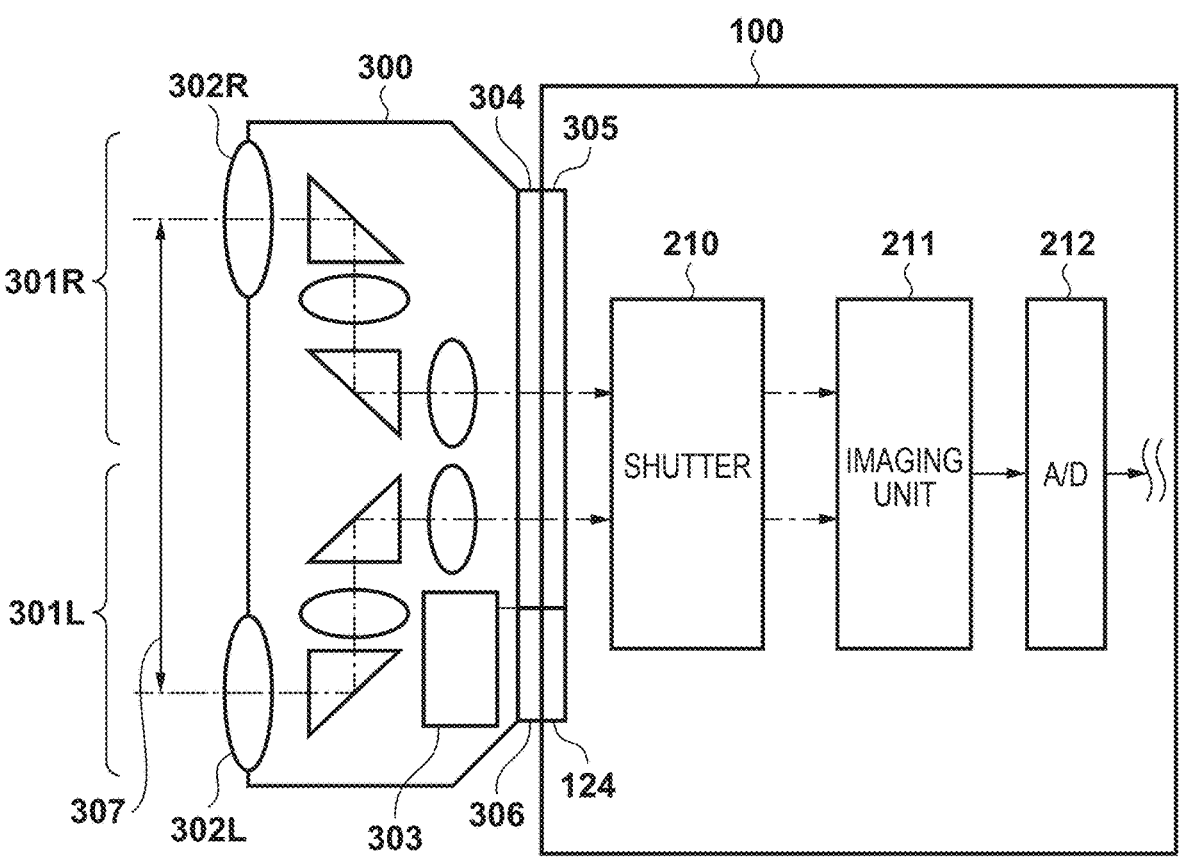
FIG. 3 is a schematic view illustrating an example of the configuration of a dual lens unit.

FIG. 3 is a schematic view illustrating an example of the configuration of a dual lens unit 300 that can be mounted on the camera 100. The dual lens unit 300 can be mounted on the camera 100 instead of the single lens unit 200. FIG. 3 illustrates a state in which the lens unit 300 is mounted on the camera 100. Note that the components of the camera 100 illustrated in FIG. 3 that are the same as the components described using FIG. 2 are given the same reference sign, and description thereof is omitted as appropriate.

The lens unit 300 is a type of interchangeable lens that is detachably attached to the camera 100. The lens unit 300 is a dual lens that can capture a left image and a right image with a parallax. The lens unit 300 includes two optical systems, both with a wide angle of view of approximately 180 degrees and being able to capture an image in a front hemispheric range. Specifically, each of the two optical systems of the lens unit 300 can capture an image of a subject in a field of view (angle of view) of 180 degrees in the left-and-right direction (horizontal angle, azimuth angle, yaw angle), and 180 degrees in the up-and-down direction (vertical angle, elevation angle, pitch angle) respectively.

The lens unit 300 includes a right eye optical system 301R including a plurality of lens, a reflection mirror, and the like; a left eye optical system 301L including a plurality of lenses, a reflection mirror, and the like; and a lens system control circuit 303. The right eye optical system 301R corresponds to an example of a first imaging optical system, and the left eye optical system 301L corresponds to an example of a second imaging optical system. The right eye optical system 301R and the left eye optical system 301L include lenses 302R and 302L, respectively, located on the subject side that face the same direction, with the optical axes being substantially parallel with one another. An inter-optical-axis distance 307 is the interval between the optical axis of the left eye optical system 301L and the optical axis of the right eye optical system 301R.

The lens unit 300 according to the present embodiment is a lens for virtual reality (VR) 180 for capturing images in a VR image format for the VR 180 enabling dual lens stereoscopic viewing, or in other words, images for the VR 180. The lens for the VR 180 includes lenses that can capture the approximately 180-degree range of the left eye optical system 301L and the right eye optical system 301R. Note that for the lens for the VR 180, it is sufficient that the left eye optical system 301L and the right eye optical system 301R can obtain images enabling dual lens VR display as the VR 180, and the lens for the VR 180 may be a lens that can capture a wide angle of view range of 160 degrees which is less than 180 degrees.

The lens for the VR 180 can form a right image (first image) formed via the right eye optical system 301R and a left image (second image) formed via the left eye optical system 301L having parallax with the right image on one or two of the image sensors of the mounted camera 100. The lens unit 300 includes an aperture driving circuit and an AF driving circuit, as in the lens unit 200. Though not illustrated, two driving circuits, an AF driving circuit for focusing by driving the lens of the right image formed via the right eye optical system 301R and an AF driving circuit for focusing by driving the lens of the left image formed via the left eye optical system 301L, are provided. The AF driving circuit can perform focusing by simultaneously driving the lens of the left image formed via the left eye optical system 301L and the lens of the right image formed via the right eye optical system 301R.

Also, the lens unit 300 is mounted on the camera 100 via a lens mount portion 304 and a camera mount portion 305 of the camera 100. By mounting the lens unit 300 on the camera 100, the system control unit 218 of the camera 100 and the lens system control circuit 303 of the lens unit 300 are electrically connected via the communication terminal 124 of the camera 100 and a communication terminal 306 of the lens unit 300.

In the present embodiment, the right image formed via the right eye optical system 301R and the left image formed via the left eye optical system 301L having a parallax with the right image side by side form an image in the imaging unit 211 of the camera 100. In other words, two optical images formed by the right eye optical system 301R and the left eye optical system 301L are formed on one image sensor. The imaging unit 211 converts the formed subject image (optical signal) into an analog electrical signal. In this manner, by using the lens unit 300, two images having a parallax can be simultaneously (as a set) obtained from two position (optical systems) corresponding to the right eye optical system 301R and the left eye optical system 301L. Also, by separating the obtained image into an image for the left eye and an image for the right eye and performs VR display, a three-dimensional VR image of an approximately 180-degree range, in other words, the VR 180, can be viewed by the user.

Here, a VR image is an image that can be VR-displayed as described below. A VR image may include an omnidirectional image (360-degree image) captured by an omnidirectional camera (360-degree camera), a panorama image with an image range (effective image range) greater than the display range that can be displayed at once on the display unit, and the like. Also, the VR image is not limited to being a still image and may include a moving image or a live image (an image obtained from the camera is substantially real time). The VR image, at maximum, has an image range (effective image range) with a field of view of 360 degrees in the left-and-right direction and 360 degrees in the up-and-down direction. Also, the VR image may include an image with an angle of view that, while being less than 360 degrees in the left-and-right direction and less than 360 degrees in the up-and-down direction, has a wider range than the angle of view that can be captured by a normal camera or an image with an image range wider than the display range that can be displayed at once on the display unit. The image captured by the camera 100 using the lens unit 300 described above is a type of VR image. The VR image, for example, can be VR-displayed by setting the display mode of the display apparatus (a display apparatus that can display a VR image) to "VR view". A VR image with an angle of view of 360 degrees is VR-displayed and the orientation of the display apparatus is changed in the left-and-right direction (horizontal rotation direction) by the user to seamlessly view an omnidirectional image in the left-and-right direction.

Here, VR display (VR view) is a display method (display mode) that displays an image of a field of view range corresponding to the orientation of the display apparatus out of the VR image and that can change the display range. The VR display may include a "single lens VR display (single lens VR view)", which performs transformation (distortion correction) to map the VR image on a virtual sphere, and then displays one image. The VR display may also include a "dual lens VR display (dual lens VR view)", which performs transformation to map the VR image for the left eye and the VR image for the right eye respectively on the virtual spheres, and then displays these images side by side in the left and right regions. By performing the "dual lens VR display" using the VR image for the left eye and the VR image for the right eye having a parallax, these VR images can be stereoscopically viewed.

In either case of the VR display, in a case where the user wears the display apparatus, for example, as a head mounted display (HMD), an image of the field of view range in accordance with the direction of the face of the user is displayed. For example, at a certain point in time, it is assumed that a VR image in the field of view range is centered at 0 degrees in the left-and-right direction (specific azimuth, such as North), and at 90 degrees in the up-and-down direction (90 degrees from the zenith, that is horizontal) is displayed. If the orientation of the display apparatus is front-back inverted from this state (for example, the display surface is changed from South-facing to North-facing), the display range of this VR image is changed to the image in the field of view range, centering at 180 degrees in the left-and-right direction (opposite azimuth, such as South), and 90 degrees in the up-and-down direction. In other words, when the user wearing the HMD turns their face from North to South (turns back), the image displayed on the HMD also changes from the image at the North to the image at the South. Note that the VR image captured using the lens unit 300 according to the present embodiment is an image of the VR 180 capturing approximately a range of approximately 180 degrees in the forward direction, and an image of a range of approximately 180 degrees in the backward direction does not exist. When the image of the VR 180 is VR-displayed in this manner and the orientation of the display apparatus is changed to the side in which an image does not exist, a blank region is displayed.

By VR-displaying the VR image in this manner, the user can experience a sensation as if they were in the VR image (VR space) from a visual perspective. Note that the method for displaying the VR image is not limited to a method for changing the orientation of the display apparatus. For example, the display range may be moved (scrolled) in accordance with a user operation via the touch panel, directional buttons, or the like. Also, during VR display (in the display mode "VR view"), in addition to changing the display range by changing the orientation, the display range may be changed by a touch-move on the touch panel, a drag operation using a mouse or the like, by pressing a directional button, or the like, for example. Note that a smartphone mounted on a VR goggle (head mounted adapter) is a type of HMD.

Configuration of Image Sensor Inside Imaging Unit

FIG. 4 is a diagram schematically illustrating a pixel array of the image sensor inside the imaging unit 211 according to the present embodiment.

FIG. 4 is a diagram illustrating a pixel array of a two-dimensional CMOS sensor used as the image sensor inside the imaging unit 211 according to the present embodiment in a range corresponding to a 4×4 array of imaging pixels (range corresponding to an 8×4 array as a focus detecting pixel array).

In the present embodiment, a pixel group 400 includes a 2×2 array of pixels and is covered by a color filter of a Bayer pattern. Also, in the pixel group 400, a pixel 400R with a red (R) spectral sensitivity is disposed at the upper-left position, a pixel 400G with a green (G) spectral sensitivity is disposed at the upper-right and the lower-left positions, and a pixel 400B with a blue (B) spectral sensitivity is disposed at the lower-right position. Also, the image sensor inside the imaging unit 211 according to the present embodiment holds, for each pixel, a plurality of photodiodes (photoelectric conversion units) per one micro lens 401 for performing focus detection using the image plane phase detection method. In the present embodiment, each pixel includes two photodiodes (photoelectric conversion elements) 402 and 403 in a 2×1 array.

The image sensor inside the imaging unit 211 can obtain imaging signals and focus signals due to the plurality of the pixel groups 400, each including the 2×2 array of pixels (4×2 array of photodiodes) illustrated in FIG. 4, being disposed on the imaging plane.

At each pixel with such a configuration, a light beam that travels through the imaging optical system and is incident is split at the micro lens 401 into each pupil region and forms an image at the photodiodes 402 and 403. Then, a signal (A+B signal) which is the sum of the signals from the two photodiodes 402 and 403 is used as the imaging signal, and the two signals (A and B image signal) read out from each photodiode 402 and 403 is used as the focus signals. Note that the imaging signal and the focus signal may each be read out, but taking the processing load into account, the following may also be performed. In other words, the imaging signal (A+B signal) and the focus signal of either the photodiode 402 or 403 (for example, the A signal) may be read out and the difference may be obtained to obtain the other focus signal (for example, the B signal).

Note that in the present embodiment, each pixel has a configuration in which the two photodiodes 402 and 403 are provided for the one micro lens 401. However, the number of photodiodes is not limited to two, and two or more may be used. Also, a plurality of pixels with different opening positions for the light-receiving portion with respect to the micro lens 401 may be provided. In other words, it is sufficient that a configuration is used that can obtain two signals for phase detection that can detect the phase difference of the A image signal and the B image signal as a result.

Also, in FIG. 4, all of the pixels include a plurality of photodiodes, but no such limitation is intended. In another configuration, pixels for focus detection such as those illustrated in FIG. 4 may be discretely provided inside a normal pixel forming the image sensor inside the imaging unit 211.

Live View Image Display Example

Figure 5A:
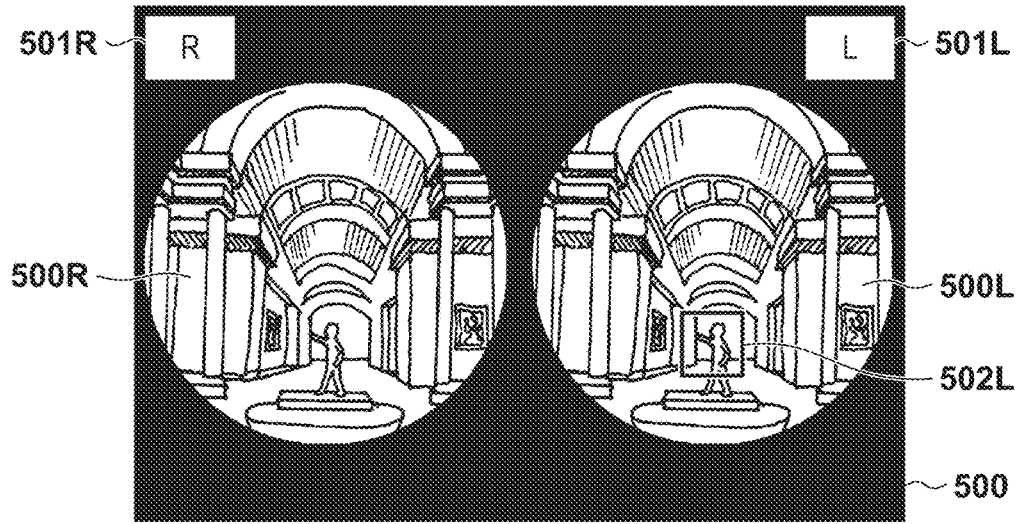
FIGS. 5A to 5C are diagrams illustrating an example of the display of a live view image in a camera mounted with a dual lens unit.
Figure 5B:
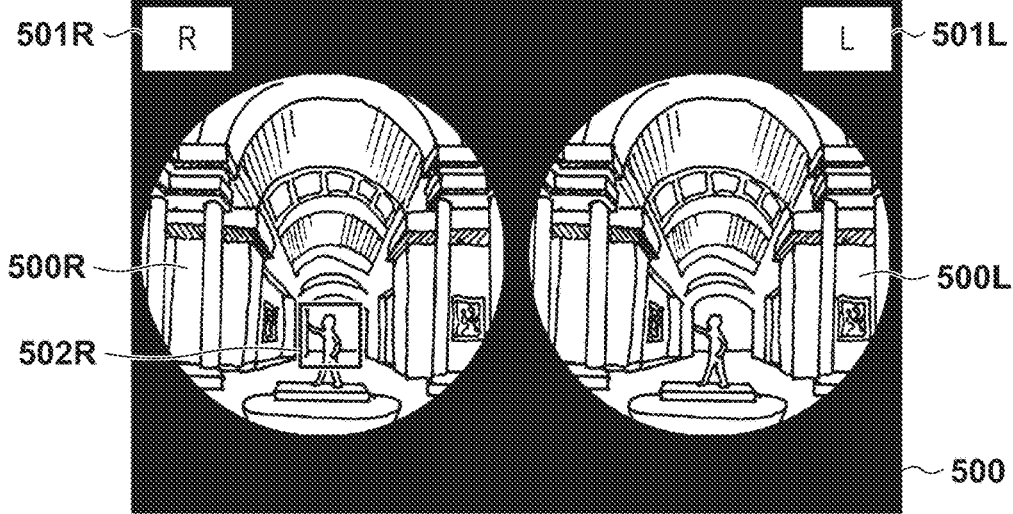
Figure 5C:
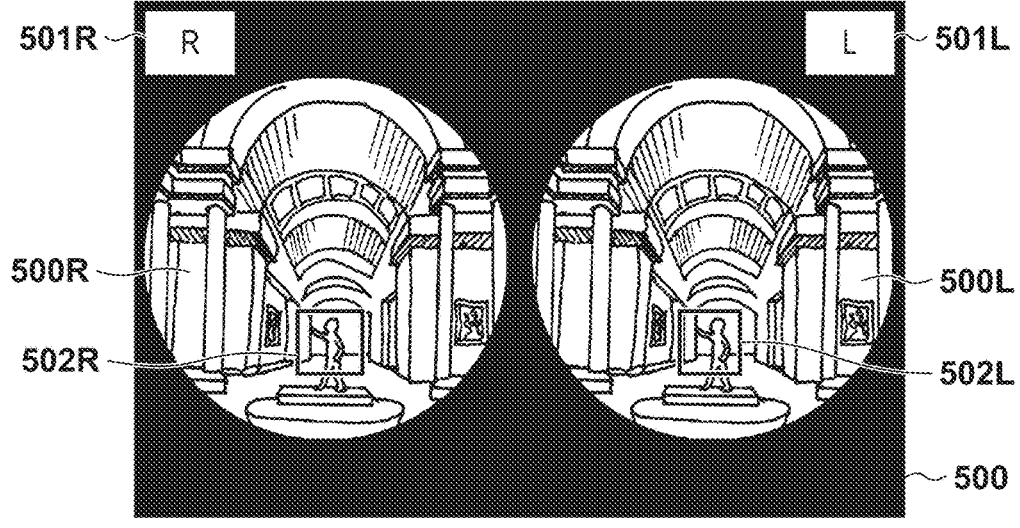

FIGS. 5A to 5C are diagrams illustrating display examples of a live view image on the display unit 108 in a case where the dual lens unit 300 is mounted on the camera 100.

FIG. 5A is a diagram illustrating an example of performing focus detection with only the left eye optical system 301L. A left image 500L formed via the left eye optical system 301L of the lens unit 300 and a right image 500R formed via the right eye optical system 301R are displayed on the display unit 108 as a live view image 500. An image 501L of the character "L" displayed in the upper-right of the screen and an image 501R of the character "R" displayed in the upper-left of the screen are a user interface (UI) display to prevent false recognition by the user, as the live view image 500 is displayed left-right inverted. A left image AF area (focus detection area) 502L is a display frame indicating the intended position for performing autofocus (AF) and is displayed in the left image 500L.

FIG. 5B is a diagram illustrating an example of performing focus detection with only the right eye optical system 301R, and a right image AF area (focus detection area) 502R is displayed in the right image 500R.

FIG. 5C is a diagram illustrating an example of simultaneously performing focus detection with the left eye optical system 301L and the right eye optical system 301R. The right image AF area 502R is displayed on the right image 500R, and the left image AF area 502L is displayed on the left image 500L.

The operations of the camera system in a case where the dual lens unit 300 is mounted will be described below using FIGS. 6 to 24.

Image Capture Processing

Figure 6:
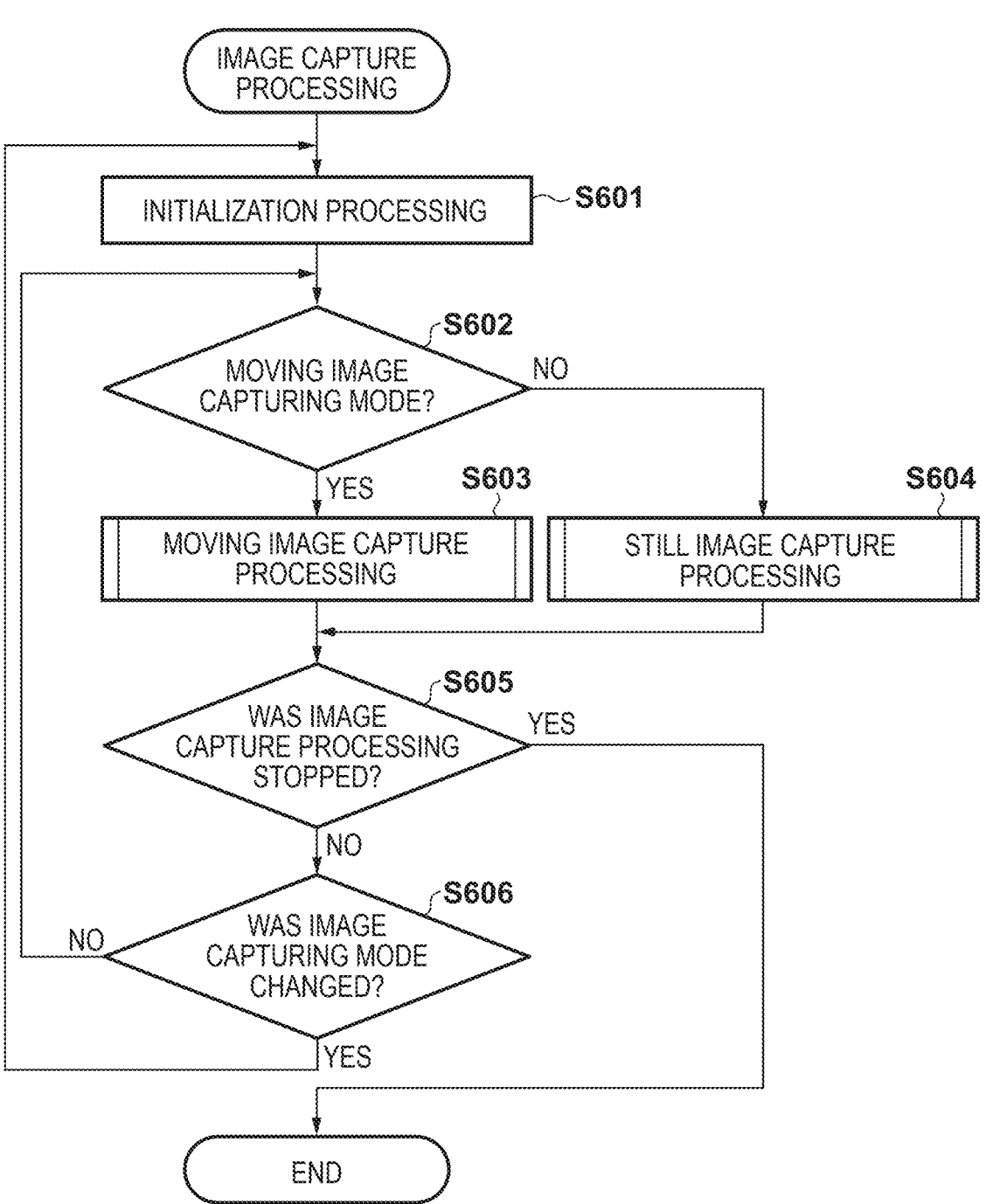
FIG. 6 is a flowchart illustrating image capture processing.

FIG. 6 is a flowchart illustrating image capture processing operations of the camera 100 according to the present embodiment. The operations of the flowchart are implemented by the system control unit 218 loading a control program stored in the non-volatile memory 220 on the system memory 219 and executing the control program. This also applies to the operations of other flowcharts described below.

First in step S601, the system control unit 218 executes initialization processing such as camera settings and the like. Then the processing proceeds to step S602.

In step S602, the system control unit 218 determines whether the image capturing mode of the camera 100 is the moving image capturing mode or the still image capturing mode. In the case of the moving image capturing mode, the processing proceeds to step S603. In the case of the still image capturing mode, the processing proceeds to step S604.

In step S603, the system control unit 218 executes moving image capture processing, and then the processing proceeds to step S605. The moving image capture processing of step S603 will be described below in detail using FIG. 7.

In step S604, the system control unit 218 executes still image capture processing, and then the processing proceeds to step S605. The still image capture processing of step S604 will be described below in detail using FIG. 8.

In step S605, the system control unit 218 determines whether or not the image capture processing has stopped. If it has not stopped, the processing proceeds to step S606. If it has stopped, the image capture processing ends. The image capture processing being stopped may include the power source of the camera 100 being disconnected via the operation unit 230 or an operation other than image capture being performed, such as camera user settings processing, a reproduction processing for captured image/moving image confirmation, and the like.

In step S606, the system control unit 218 determines whether or not the image capturing mode has changed. If it has changed, the processing returns to step S601. If it has not changed, the processing returns to step S602.

In a case where the image capturing mode has not changed, the system control unit 218 continuously executes the current image capturing mode. In a case where the image capturing mode has changed, the processing of the image capturing mode changed to is executed after the initialization processing of step S601 is executed.

Moving Image Capture Processing

The moving image capture processing of step S603 of FIG. 6 will now be described using the flowchart of FIG. 7.

In steps S701 to S704, the system control unit 218 performs control relating to moving image recording.

In step S701, the system control unit 218 determines whether or not the moving image button 106 is on. If it is on, the processing proceeds to step S702. If it is not on, the processing proceeds to step S705.

In step S702, the system control unit 218 determines whether or not moving image recording is currently in progress. In a case where moving image recording is not in progress, in step S703, the system control unit 218 starts moving image recording, and then the processing proceeds to step S705. In a case where moving image recording is in progress, in step S704, the moving image recording is stopped, and the processing proceeds to step S705.

In the present embodiment, moving image recording is started and stopped each time the moving image button 106 is pressed. However, a different method may be used to start and stop recording, such as different buttons being used to start and stop recording, a switch for switching being used, and the like.

In step S705, the system control unit 218 executes focus detection processing, and then the processing proceeds to step S706. Focus detection processing is processing executed by the system control unit 218 to obtain defocus information and reliability information for performing AF. The details will be described below using FIG. 9.

In step S706, the system control unit 218 determines whether or not focusing is currently stopped. If focusing is stopped, the processing proceeds to step S707. If focusing is not stopped, the processing proceeds to step S708.

In step S707, the system control unit 218 executes processing in the focusing stopped state, and the moving image capture processing ends. The processing of step S707 is processing executed with the subject focused on for determining whether or not to perform focusing control again due to the main subject moving or changing. The details will be described below using the flowchart of FIG. 11.

In step S708, the system control unit 218 executes the processing in the focusing state, and then the moving image capture processing ends. In step S708, focusing control is performed on the basis of the information of step S705. The details will be described below using FIG. 12.

Still Image Capture Processing

Figure 8:
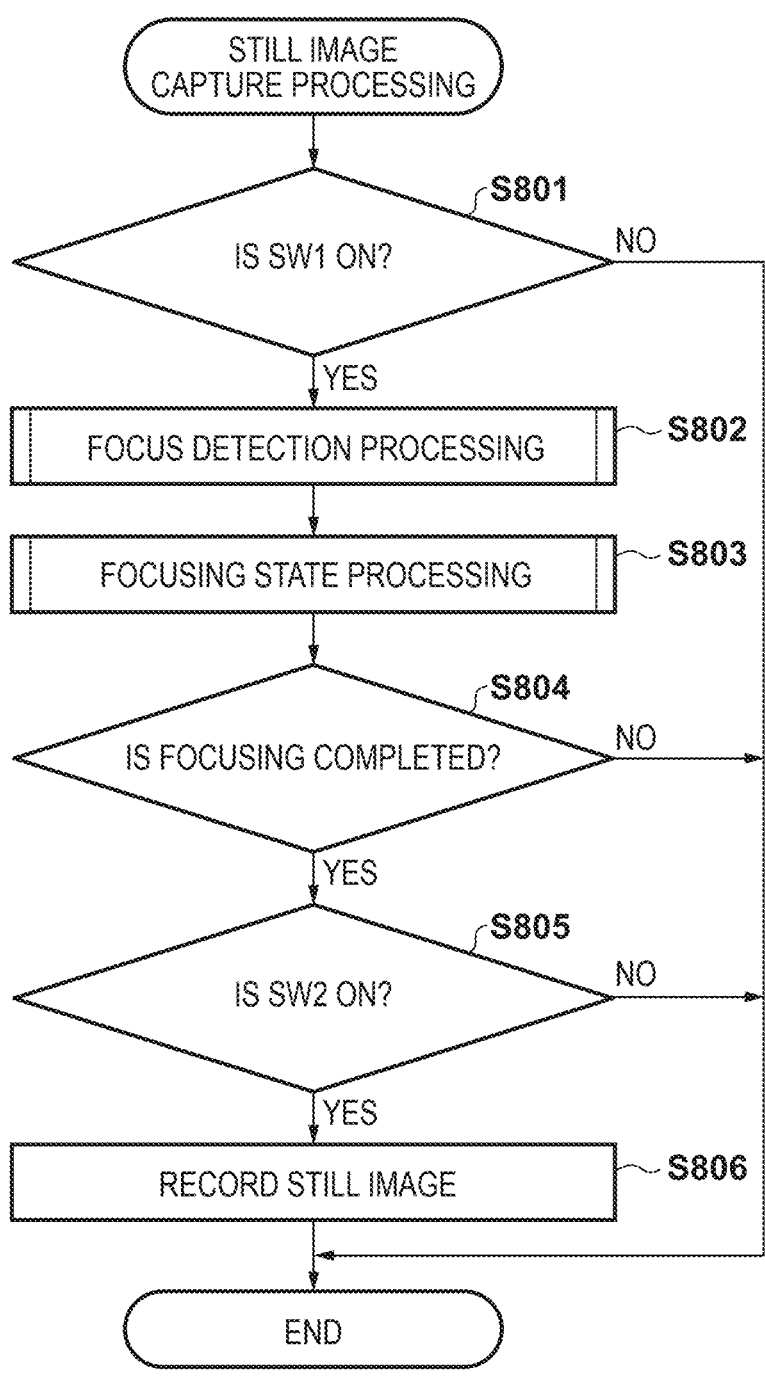
FIG. 8 is a flowchart illustrating still image capture processing.

The still image capture processing of step S604 of FIG. 6 will now be described using the flowchart of FIG. 8.

In step S801, the system control unit 218 determines whether or not the first shutter switch 232 has been pressed. If the first shutter switch 232 has been pressed, the processing proceeds to step S802. If the first shutter switch 232 has not been pressed, the still image capture processing ends.

In step S802, the system control unit 218 executes focus detection processing, and then the processing proceeds to step S803.

As in step S705 of FIG. 7, the focus detection processing of step S802 is processing executed by the system control unit 218 to obtain defocus information and reliability information for performing AF. The details will be described below using FIG. 9.

In step S803, the system control unit 218 executes focusing state processing, and then the processing proceeds to step S804. As in step S708 of FIG. 7, in step S803, focusing control is performed on the basis of the information of step S802 by the system control unit 218. The details will be described below using FIG. 12.

In step S804, the system control unit 218 determines whether or not focusing has been completed. If focusing has been completed, the processing proceeds to step S805. If focusing has not been completed, the still image capture processing ends.

In step S805, the system control unit 218 determines whether or not the second shutter switch 233, which is the image capture start button, has been pressed. If it has been pressed, the processing proceeds to step S806. If it has not been pressed, the still image capture processing ends.

In step S806, the system control unit 218 records a still image on the recording medium 229, and then the still image capture processing ends.

In the present embodiment, the image capture of step S805 can only be started when focusing has been determined to have been completed in step S804.

Note that the present embodiment is not limited to this configuration, and in another configuration, still image recording can be started before focusing is completed when the image capture start button is pressed, for example. Also, in a case where, after focusing is complete in step S804, in step S805, the still image capture processing is started again without the image capture start button being pressed, focus detection is performed in step S802. In this case, in the focusing state processing of step S803, the lens 302R and 302L may be driven or may not be driven. Also, after focusing is complete in step S804, the processing from step S802 to step S803 may not be executed.

Example 1 of Focus Detection Processing

Example 1 of the focus detection processing executed in step S705 of FIG. 7 and step S802 of FIG. 8 will be described using the flowchart of FIG. 9.

As in FIG. 5A, FIG. 9 illustrates focus detection processing in a case where the left image AF area 502L, the focus detection area, is set for the left image 500L. Or, as in FIG. 5B, it illustrates focus detection processing in a case where the right image AF area 502R, the focus detection area, is set for the right image 500R.

First, in step S901, the system control unit 218 sets the focus detection area to a position, within the focus detection range of the image capture screen, where focus state detection is performed according to information based on the current AF area setting mode and the display frame position.

In step S902, the system control unit 218 obtains a pair of image signals for AF from pixels included in the set focus detection area.

In step S903, the system control unit 218 calculates the amount of correlation between the obtained image signals and then, in step S904, calculates the correlation change amount from the amount of correlation calculated in step S903.

In step S905, the system control unit 218 calculates the correlation change amount and the off-focus amount.

In step S906, the system control unit 218 calculates the reliability representing how much the off-focus amount can be trusted. This processing is executed for each focus detection area that exists in the focus detection range set in step S901.

In step S907, the system control unit 218 converts the off-focus amount to a defocus amount for each focus detection area, and then the focus state detection processing ends.

Example 2 of Focus Detection Processing

Example 2 of the focus detection processing executed in step S705 of FIG. 7 and step S802 of FIG. 8 will be described using the flowchart of FIG. 10.

Figure 10:
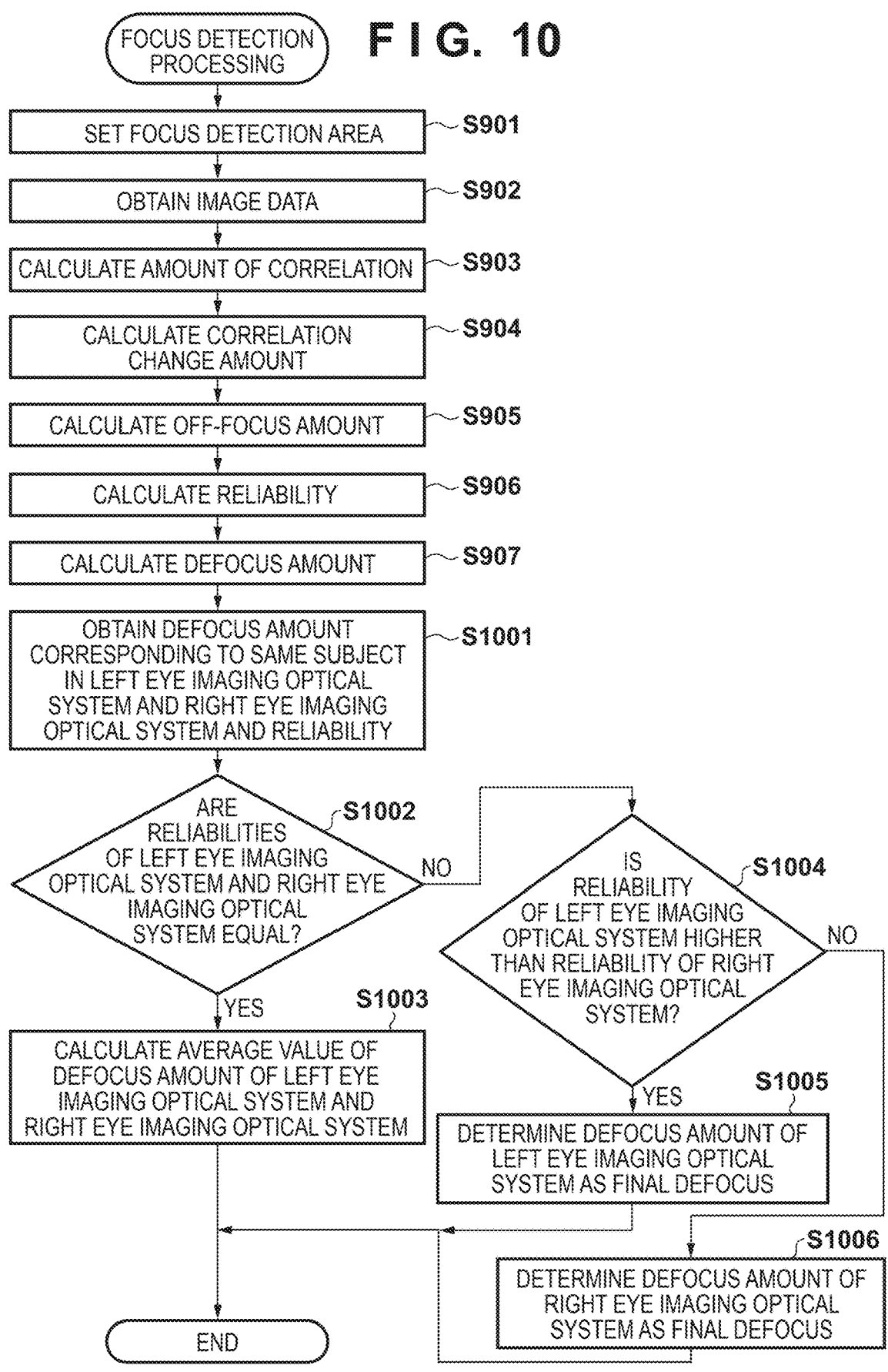
FIG. 10 is a flowchart illustrating Example 2 of focus detection processing.

As in FIG. 5C, FIG. 10 illustrates focus detection processing in a case where the left image AF area 502L is set for the left image 500L and the right image AF area 502R is set for the right image 500R simultaneously.

Steps S901 to S907 are the same as steps S901 to S907 of FIG. 9. Note that the processing of steps S901 to S907 is executed for the left image 500L and the right image 500R.

In step S1001, the system control unit 218 obtains, for the left image 500L and the right image 500R, the defocus amount of the focus detection area with respect to the same subject and the reliability thereof.

In step S1002, the system control unit 218 compares the reliability of the defocus amount corresponding to the left image 500L and the right image 500R. If it is equal, the processing proceeds to step S1003. If it is not equal, the processing proceeds to step S1004.

In step S1003, the system control unit 218 calculates the average value of the defocus amount of the left image 500L and the right image 500R and determines this as the final defocus amount. Then, the focus state detection processing ends.

In step S1004, the system control unit 218 compares the reliability of the defocus amount of the left image 500L and the right image 500R. If the reliability of the left image 500L is higher, the processing proceeds to step S1005. Otherwise, the processing proceeds to step S1006.

In step S1005, the system control unit 218 determines the defocus amount of the left image 500L as the final defocus amount. Then, the focus state detection processing ends.

In step S1006, the system control unit 218 determines the defocus amount of the right image 500R as the final defocus amount. Then, the focus state detection processing ends.

Focusing Stopped State Processing

Next, the focusing stopped state processing executed in step S707 of FIG. 7 will be described using the flowchart of FIG. 11. The focusing stopped state processing is processing for determining whether or not to drive the lenses 302R and 302L again when "focusing" is determined and the lenses 302R and 302L are stopped.

In step S1101, the system control unit 218 determines whether or not the calculated defocus amount is less than a predetermined multiple (for example, a multiple of one or more) of the focus depth. If it is less, the processing proceeds to step S1102. If it is greater, the processing proceeds to step S1104.

In step S1102, the system control unit 218 determines whether or not the calculated reliability is greater than a predetermined value. If it is greater than the predetermined value, the processing proceeds to step S1103. Otherwise, the processing proceeds to step S1104.

In step S1103, the system control unit 218 resets the AF restart counter, and the processing proceeds to step S1105.

In step S1104, the system control unit 218 counts-up the AF restart counter, and the processing proceeds to step S1105.

In this manner, in a case where the defocus amount is equal to or greater than the predetermined amount or the reliability of the defocus amount is less than the predetermined value, the system control unit 218 determines that the main subject of image capture has changed. Then, in step S1104, preparation to restart AF (re-drive the lenses 302R and 302L) is performed. On the other hand, in a case where it is determined from the magnitude of the defocus amount and the reliability that the main subject has not changed, in step S1103, the system control unit 218 does not restart AF (maintains the stopped state of the lenses 302R and 302L).

The threshold of the defocus amount set in step S1101 is empirically or experimentally set so that AF restart is performed when the main subject has changed and so that AF restart tends not to be performed when the main subject has not changed. As an example, 1 times the focal depth is set so that the main subject looks blurry.

Also, the threshold of the reliability set in step S1102 is set so that, when the reliability is so low that it is difficult to determine the defocus direction, for example, it is determined that the main subject has changed and that AF is to be restarted.

This determination of steps S1101 and S1102 may be referred to as processing to determine whether or not the main subject has changed. Accordingly, it may be substituted with any processing that can perform a similar determination, and the type and value of the threshold used is set according to the processing method.

In step S1105, the system control unit 218 determines whether or not the value of the AF restart counter is equal to or greater than a predetermined threshold. If the value is equal to or greater than the threshold, the processing proceeds to step S1106. If the value is less than the threshold, the focusing stopped state processing ends.

In step S1106, the system control unit 218 performs setting to transition to the focusing state, and the processing proceeds to step S1107.

In step S1107, the system control unit 218 resets the AF restart counter, and the focusing stopped state processing ends.

In the present embodiment, each time the AF restart of step S1106 is performed and the state transitions to the focusing state, in step S1104, the system control unit 218 determines whether or not the added value of the AF restart counter is equal to or greater than a predetermined threshold.

In other words, the AF restart determination (of whether or not the main subject has changed) is not performed on the basis of one determination of the magnitude of the defocus amount and the reliability, and it is desirably set on the basis of a statistic of the determination result obtained in a certain time period. A smaller threshold for the AF restart determination results in the subject being more closely followed. However, it leads the possibility of inadvertent focusing when another subject cuts across the main subject or the like. Thus, the threshold for the AF restart determination is set taking into account this issue. Also, in step S1107, the AF restart counter is reset in case the state transitions from the focusing state to the focusing stopped state again.

Focusing State Processing

The focusing state processing of step S708 of FIG. 7 and step S803 of FIG. 8 will be described below using the flowchart of FIG. 12. The focusing state processing is processing executed to determine driving of the lens in a state in which focusing is not stopped and focusing stopping.

In step S1201, the system control unit 218 determines whether or not the magnitude of the defocus amount is equal to or less than the predetermined amount (in this example, the focal depth) and the reliability of the defocus amount is greater than the predetermined value. In a case where these conditions are met, the system control unit 218 proceeds the processing to step S1202. Otherwise, the processing proceeds to step S1203. In the present embodiment, the threshold used in step S1201 is 1 times the focal depth. However, the threshold may be set to a larger or smaller value as necessary. The threshold for the reliability set in step S1201 is set so that at least the focusing accuracy can be guaranteed.

In step S1202, the system control unit 218 sets the state to transition to the focusing stopped state, and the focusing state processing ends. In the moving image capture processing of FIG. 7, if it is determined that the subject is focused on, the state transitions from a state in which the lenses 302R and 302L are driven to a stopped state. Thereafter, the focusing stopped state processing of step S707 of FIG. 7 is executed to perform restart determination to determine whether or not to drive (restart) the lenses 302R and 302L again.

In step S1203, the system control unit 218 executes processing to drive the lenses 302R and 302L. The processing to drive the lenses 302R and 302L will be described below in detail using FIGS. 13 to 15.

In step S1204, a three-dimensional range UI display is performed, and the focusing state processing ends. The three-dimensional range UI display will be described below in detail using FIG. 17.

Note that the three-dimensional range has been described in the Background of the Invention, but will be described here again. The three-dimensional range is the range of the distance from the camera to the subject (subject distance) when capturing VR images that allows for comfortable stereoscopic viewing when captured images are displayed. In a case where the subject is closer than the three-dimensional range, the parallax of the subject increases, causing double vision of the image. Also, in a case where the subject is farther away than the three-dimensional range, the parallax decreases, causing the image to appear simply flat and thus losing the stereoscopic effect. In other words, to achieve a good stereoscopic effect where a close subject looks as though it is jumping out at you and where a distant subject looks as though it is receded, image capture needs to be performed at a subject distance with this three-dimensional range.

Example 1 of Lens Drive Processing

Next, Example 1 of the lens drive processing executed in step S1203 of FIG. 12 will be described using the flowchart of FIG. 13. If the current image capture distance is within the three-dimensional range, lens driving is performed in the three-dimensional range. If the current image capture distance is outside the three-dimensional range, lens driving is performed by searching and driving from the three-dimensional range end position.

In step S1301, the system control unit 218 calculates the three-dimensional range from the interval (inter-optical-axis distance 307) between the optical axes of the left eye optical system 301L and the right eye optical system 301R, display device information viewed as a three-dimensional image, angle of view information at the time of image capture, and information of the parallax angle, which is the difference between the convergence angle and the angle when the three-dimensional image jumps out or recedes back at a virtual position. Then, the processing proceeds to step S1302.

The interval between the optical axes is obtained by the system control unit 218 communicating with the lens system control circuit 303 of the lens unit 300 when the camera 100 is activated. Also, the system control unit 218 obtains the setting value set from the menu button 115 of the camera 100.

The display device information viewed as a three-dimensional image is display device viewing distance and display device size information, and the system control unit 218 obtains the setting value set from the menu button 115 of the camera 100.

The HMD viewing distance corresponds to the distance to the display in the virtual space. The angle of view information is obtained by the system control unit 218 communicating with the lens system control circuit 303 of the lens unit 300. For the parallax angle, which is the difference between the convergence angle and the angle when the three-dimensional image jumps out or recedes back at a virtual position, the system control unit 218 obtains the setting value, set from the menu button 115 of the camera 100.

Typically, a comfortable parallax range (parallax angle) of the three-dimensional image is set within ±1.0 degrees. Also, the parallax angle may be able to be set independently for when jumping out at the virtual position (close range side of the image capture distance) and when receding back at the virtual position (infinite distance side of the image capture distance). Also, for when receding back at the virtual position (infinite distance side of the image capture distance), it can be set that no limit to the three-dimensional range is set. The display device information, the angle of view information at the time of image capture, the convergence angle and the parallax angle, and the relationship between the lens optical axis interval and the three-dimensional range will be described below using FIGS. 16A and 16B.

In step S1302, the system control unit 218 calculates the current image capture distance, and the processing proceeds to step S1303. The current image capture distance information is obtained and calculated by the system control unit 218 communicating the image capture distance information based on the position of the lenses 302R and 302L with the lens system control circuit 303 of the lens unit 300. Alternatively, the system control unit 218 may calculate this using a triangulation method.

In step S1303, the system control unit 218 calculates the target focus position for driving the lenses from the defocus amount calculated in step S907 of FIG. 9. Then, the target image capture distance information corresponding to the target focus position is calculated on the basis of the information of the lens unit 300, and the processing proceeds to step S1304. Here, the lens driving method is also determined. For example, in a case where the defocus amount reliability is high, the lens (focus lens) is driven on the basis of the defocus amount. In a case where the defocus amount reliability is low, the defocus amount is ignored, and a selection is performed so that an all-area search and drive is performed of the three-dimensional range area calculated in step S1301 to detect the focus position, for example. Also, the parameters for driving such as the lens driving speed and the like are set.

In step S1304, the system control unit 218 determines whether or not the current image capture distance calculated in step S1302 is in the three-dimensional range calculated in step S1301. In a case where these conditions are met, the processing proceeds to step S1305. Otherwise, the processing proceeds to step S1308.

In step S1305, the system control unit 218 determines whether or not the target image capture distance calculated in step S1303 is in the three-dimensional range calculated in step S1301. In a case where this conditions is met, the processing proceeds to step S1306. Otherwise, the processing proceeds to step S1307.

In step S1306, the system control unit 218 drives the lens to the target focus position calculated in step S1303, and the lens drive processing ends.

In step S1307, the lens is driven to the focus position corresponding to the end of the three-dimensional range calculated in step S1301 of the target focus position direction calculated in step S1303, and the lens drive processing ends. If the direction of the target image capture distance is the close range side, the lens is driven to the focus position corresponding to the close range end in the three-dimensional range. If the direction of the target image capture distance is the infinite distance side, the lens is driven to the focus position corresponding to the infinite end in the three-dimensional range. In other words, the lens driving is restricted to the focus positions corresponding to in the three-dimensional range. Here, in steps S1306 and S1307, if the reliability of the defocus amount is low and the defocus amount cannot be trusted, an all-area search and drive is performed of the three-dimensional range calculated in step S1301 to detect the focus position.

In step S1308, in a case where the current image capture distance is outside the three-dimensional range (such as when AF starts or the like) and the current image capture distance corresponds to the close range side of the three-dimensional range, the system control unit 218 proceeds the processing to step S1309. Otherwise (in the case of the infinite distance side of the three-dimensional range), the processing proceeds to step S1310.

In this case, to perform an all-area search and drive of the three-dimensional range area, in step S1309, a search and drive is performed from the focus position corresponding to the close range end of the three-dimensional range in the infinite direction, and the lens drive processing ends. In step S1310, a search and drive is performed from the focus position corresponding to the infinite end of the three-dimensional range in the close range direction, and the lens drive processing ends.

Example 2 of Lens Drive Processing

Next, Example 2 of the lens drive processing executed in step S1203 of FIG. 12 will be described using the flowchart of FIG. 14. If the current image capture distance is in the three-dimensional range, lens driving is performed to the focus position corresponding to in the three-dimensional range. If the current image capture distance is outside the three-dimensional range, lens driving is not performed, and this being outside the three-dimensional range is communicated.

Figure 13:
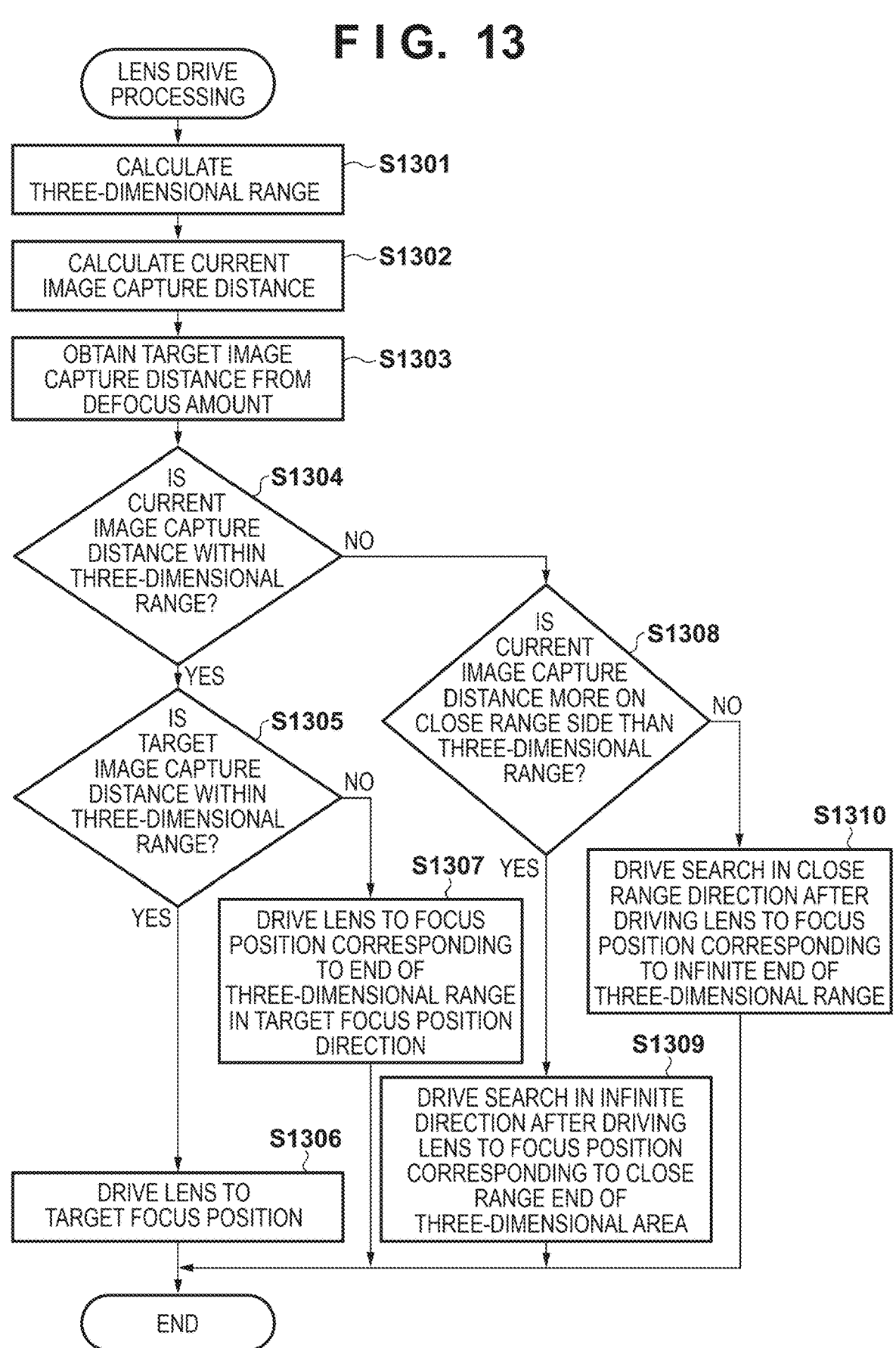
FIG. 13 is a flowchart illustrating Example 1 of lens drive processing.

Steps S1301 to S1307 are the same as steps S1301 to S1307 of FIG. 13.

As illustrated in FIG. 14, in step S1304, in a case where the current image capture distance is outside the three-dimensional range, the system control unit 218 proceeds the processing to step S1401.

In step S1401, the system control unit 218 notifies the user of the current image capture distance being outside the three-dimensional range and ends lens drive processing without performing lens driving. The notification details will be described below using FIGS. 18 to 20.

Example 3 of Lens Drive Processing

Next, Example 3 of the lens drive processing executed in step S1203 of FIG. 12 will be described using the flowchart of FIG. 15. If the target image capture distance is in the three-dimensional range, lens driving is performed to the target focus position. If the current image capture distance is outside the three-dimensional range, lens driving is not performed, and this being outside the three-dimensional range is communicated.

Steps S1301 to S1306 and steps S1308 to S1310 are the same as in FIG. 13.

Figure 15:
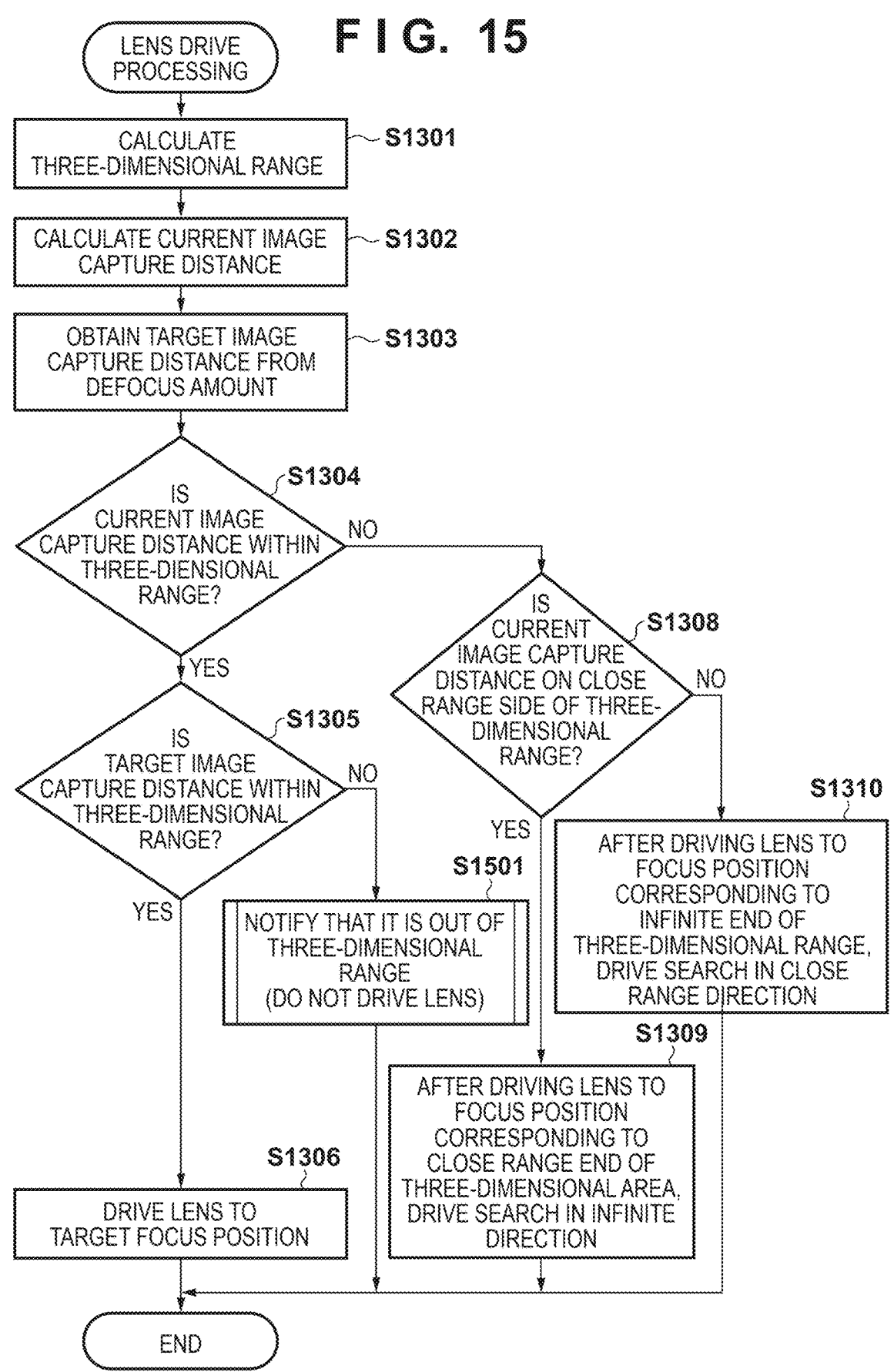
FIG. 15 is a flowchart illustrating Example 3 of lens drive processing.

As illustrated in FIG. 15, in step S1305, in a case where the target image capture distance is outside the three-dimensional range, the system control unit 218 proceeds the processing to step S1501.

In step S1501, the system control unit 218 notifies the user of the target image capture distance being outside the three-dimensional range and ends lens drive processing without performing lens driving. The notification details will be described below using FIGS. 18 to 24.

Three-Dimensional Range Calculation Example

The calculation of the three-dimensional range in step S1301 will now be described using FIGS. 16A and 16B.

Figure 16B:
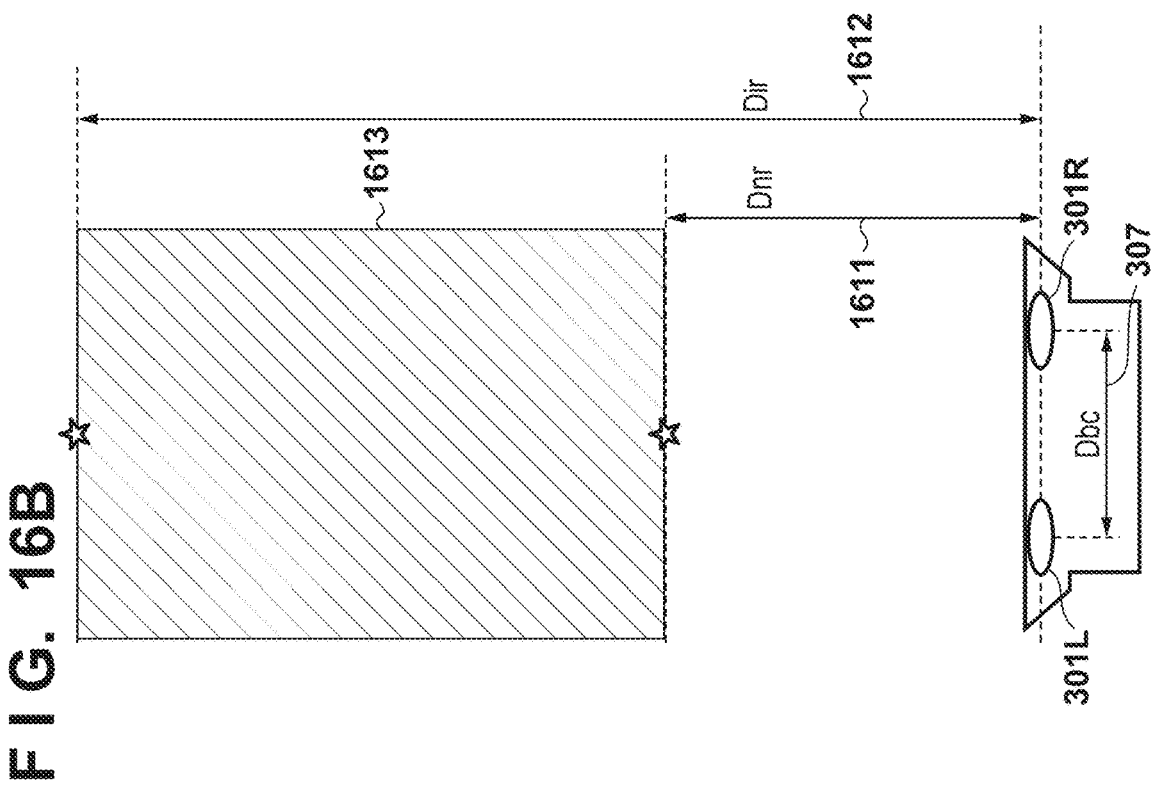
FIGS. 16A and 16B are diagrams relating to three-dimensional range calculation.
Figure 16A:
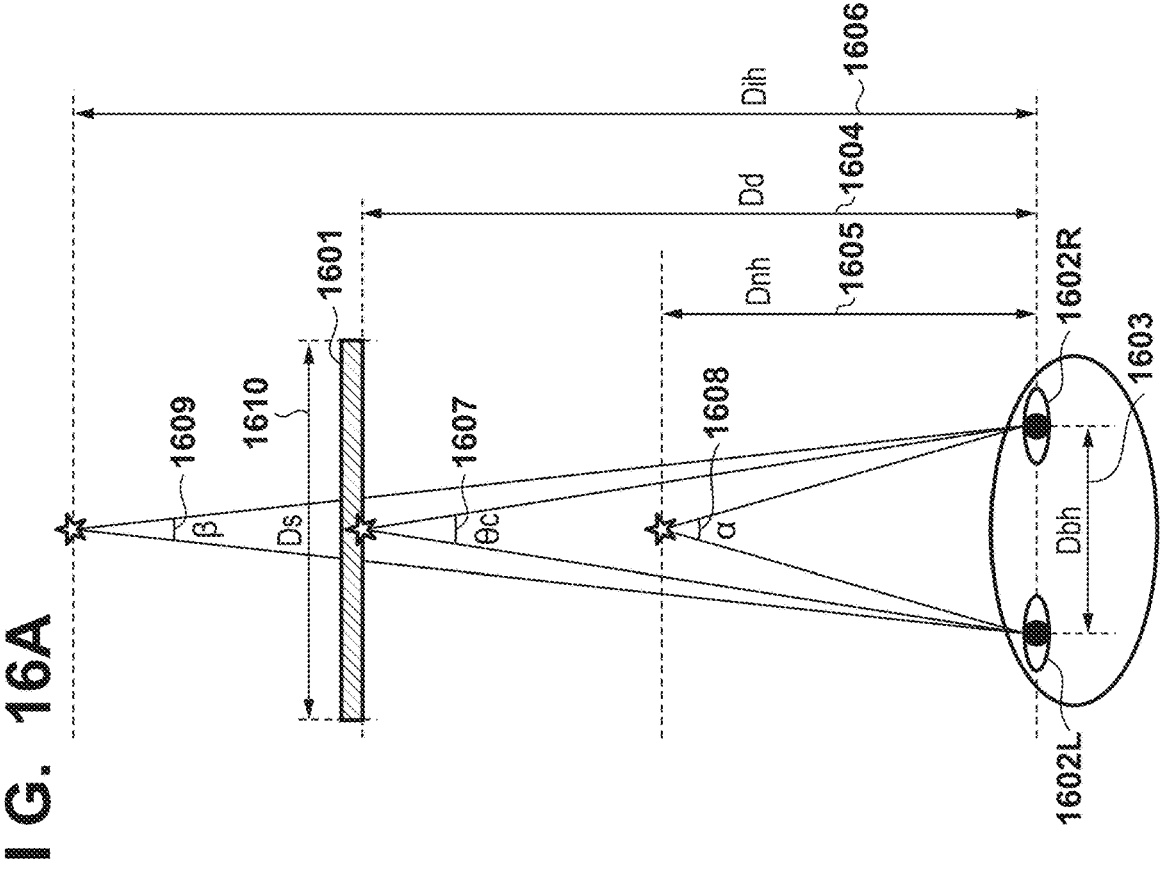

FIG. 16A illustrates the viewing space as seen from above when a person views a display device 1601. FIG. 16B illustrates the image capture space as seen from above when the camera 100 mounted with the dual lens unit 300 illustrated in FIG. 3 is capturing an image.

In FIG. 16A, an inter-optical-axis distance 1603 (Dbh) between the eyes of the person is obtained from the distance between a left eye 1602L and a right eye 1602R. The inter-optical-axis distance 1603 (Dbh) between the eyes of the person may be the average value of the inter-optical-axis distances of typical people, or a value set from a menu may be used.

A display device viewing distance 1604 (Dd) is obtained from the distance from the display device 1601 to the left eye 1602L and the right eye 1602R. A convergence angle 1607 ($\theta c$) indicates the convergence angle when a three-dimensional image is viewed at the position of the display device and is obtained from the inter-optical-axis distance 1603 (Dbh) between the eyes of the person and the display device viewing distance 1604 (Dd) using Formula (1).

$$\theta c = 2\tan^{-1}\left(Dbh/2Dd\right) \tag{1}$$

The limit convergence angle where the three-dimensional image looks like it is jumping out on the close range side is represented by a close range side limit convergence angle 1608 ($\alpha$), and the limit convergence angle where the three-dimensional image looks like it is receded back on the infinite distance side is represented by an infinite distance side limit convergence angle 1609 ($\beta$).

The close range side limit convergence angle 1608 ($\alpha$) and the infinite distance side limit convergence angle 1609 ($\beta$) are obtained from a parallax angle ($\theta p$), which is the parallax angle allowing for comfortable viewing, using a convergence angle 1607 ($\theta c$) as a reference. Thus, convergence angles have the relationships in Formula (2-1) and Formula (2-2).

$$\alpha = \theta c + \theta p \tag{2-1}$$

$$\beta = \theta c - \theta p \tag{2-2}$$

Note that as described above, typically, the parallax angle ($\theta p$) is approximately 1.0 degrees. Here, the same parallax angle ($\theta p$) is used for the close range side and the infinite distance side. However, it may be different for the close range side and the infinite distance side.

A close range side limit three-dimensional viewing distance 1605 (Dnh) and an infinite distance side limit three-dimensional viewing distance 1606 (Dih) indicate the distance from a position where a three-dimensional image in accordance with the close range side limit convergence angle 1608 ($\alpha$) and the infinite distance side limit convergence angle 1609 ($\beta$) can be seen and the left eye 1602L and the right eye 1602R. The close range side limit three-dimensional viewing distance 1605 (Dnh) and the infinite distance side limit three-dimensional viewing distance 1606 (Dih) are obtained from Formula (3-1) and Formula (3-2).

$$Dnh = Dbh/\left(2\tan\left(\alpha/2\right)\right) \tag{3-1}$$

$$Dih = Dbh/\left(2\tan\left(\beta/2\right)\right) \tag{3-2}$$

A close range side limit three-dimensional image capture distance 1611 (Dnr) and an infinite distance side limit three-dimensional image capture distance 1612 (Dir) of FIG. 16B are the distance from the left eye optical system 301L and the right eye optical system 301R to the image capture subject position of the respective limits that allow for comfortable viewing. The close range side limit three-dimensional image capture distance 1611 (Dnr) and the infinite distance side limit three-dimensional image capture distance 1612 (Dir) are obtained by converting the close range side limit three-dimensional viewing distance 1605 (Dnh) and the infinite distance side limit three-dimensional viewing distance 1606 (Dih) in the viewing space described above into the image capture space. In the conversion, here, inter-optical-axis distance conversion and angle of view conversion is used, but other conversions may be used.

The inter-optical-axis distance conversion includes multiplying an inter-optical-axis distance conversion coefficient (Cb) calculated from the inter-optical-axis distance 1603 (Dbh) between the eyes of the person and the inter-optical-axis distance 307 (Dbc) of the camera 100 by the close range side limit three-dimensional viewing distance 1605 (Dnh) and the infinite distance side limit three-dimensional viewing distance 1606 (Dih). The inter-optical-axis distance conversion coefficient (Cb) is represented by Formula (4).

$$Cb = Dbc/Dbh \tag{4}$$

The angle of view conversion includes multiplying an angle of view conversion coefficient (Ca) by the close range side limit three-dimensional viewing distance 1605 (Dnh) and the infinite distance side limit three-dimensional viewing distance 1606 (Dih). The angle of view conversion coefficient (Ca) is calculated using a viewing angle of view ($\gamma$) calculated from the display size of the display device 1601 at the time of viewing and the display device viewing distance 1604 (Dd) and an image capture angle of view ($\delta$) of the lens unit 300 at the time of image capture. The viewing angle of view ($\gamma$) is calculated from a horizontal display size 1610 (Ds) of the display device 1601 and the display device viewing distance 1604 (Dd) using Formula (5).

$$\gamma = \tan^{-1}\left(Ds/2Dd\right) \tag{5}$$

Note that typically, for the display device viewing distance 1604 (Dd), three times the vertical display size of the display device 1601 is appropriate. From this relationship, the viewing angle of view ($\gamma$) may be obtained on the basis of the display device viewing distance 1604 (Dd) or the vertical or horizontal display size of the display device 1601 and the aspect ratio.

The image capture angle of view ($\delta$) is obtained by the system control unit 218 by communication with the lens unit 300. Alternatively, it is calculated from a horizontal size Dsh of the image sensor and an obtained focal length F of the lens using Formula (6).

$$\delta = 2\tan^{-1}\left(Dsh/2F\right) \tag{6}$$

Note that here, the angle in the horizontal direction of the viewing angle of view and the image capture angle of view are used, but the angle in the vertical direction or diagonal direction may be used.

The angle of view conversion coefficient (Ca) is calculated from the viewing angle of view ($\gamma$) and the image capture angle of view ($\delta$) using Formula (7).

$$Ca = \tan\left(\gamma/2\right)/\tan\left(\delta/2\right) \tag{7}$$

The close range side limit three-dimensional image capture distance 1611 (Dnr) and the infinite distance side limit three-dimensional image capture distance 1612 (Dir) are calculated using Formula (8-1) and Formula (8-2), respectively.

$$Dnr = Dnh \times Cb \times Ca \qquad (8\text{--}1)$$

$$Dir = Dih \times Cb \times Ca \qquad (8\text{--}2)$$

A three-dimensional range 1613 in the image capture space is the area between the close range side limit three-dimensional image capture distance 1611 (Dnr) and the infinite distance side limit three-dimensional image capture distance 1612 (Dir) obtained as described above. Also, in a case where the three-dimensional range 1613 is restricted on only the close range side, the range may be farther than the close range side limit three-dimensional image capture distance 1611 (Dnr).

Three-Dimensional Range UI Display Example

An example of UI display to a live view image of a three-dimensional range calculated in step S1301 of FIG. 13 performed in step S1204 of FIG. 12 will now be described using FIG. 17. FIG. 17's parts 17a, 17, and 17c illustrate image capture distance information 1701 displayed on the live view image of FIGS. 5A to 5C.

A current image capture distance position 1702 indicates the current image capture distance calculated in step S1302 of FIG. 13. A target image capture distance position 1703 indicates the target image capture distance calculated in step S1303 of FIG. 13. A close range side lens driving limit area 1704 and an infinite distance side lens driving limit area 1705 indicate image capture distance areas outside the area of the three-dimensional range calculated in step S1301 of FIG. 13.

The display of the image capture distance information 1701 corresponds to part 17a of FIG. 17 in a case where the three-dimensional range is not limited, to part 17b of FIG. 17 in a case where the close range side and the infinite distance side are limited, and to part 17c of FIG. 17 in a case where only the close range side is limited.

By displaying the three-dimensional range on the image capture distance information display in this manner, the user can easily check whether or not the current image capture distance and the target image capture distance are in the three-dimensional range.

Example 1 of Outside Three-Dimensional Range Notification (Notification Via Text and Icon)

An example of a notification for an outside three-dimensional range warning displayed via text and an icon on the live view image 500 in step S1401 of FIG. 14 and step S1501 of FIG. 15 will now be described using FIGS. 18 and 19A to 19C.

FIG. 18 is a flowchart for describing the operations of the outside three-dimensional range notification processing of steps S1401 and S1501.

First, in step S1801, the system control unit 218 determines the text or icon to display on the live view image 500. In step S1802, the system control unit 218 displays the text or icon determined in step S1801 on the live view image 500 and ends the outside three-dimensional range notification processing.

Figure 19A:
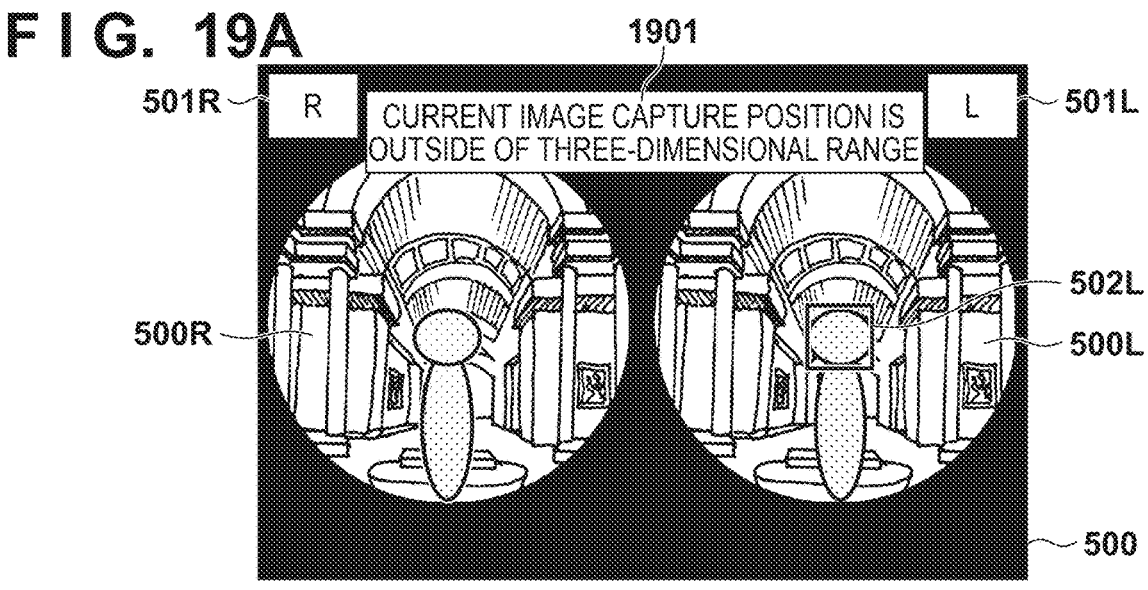
FIGS. 19A to 19C are diagrams illustrating examples of the display of text and an icon according to Example 1 of the outside three-dimensional range warning.
Figure 19B:
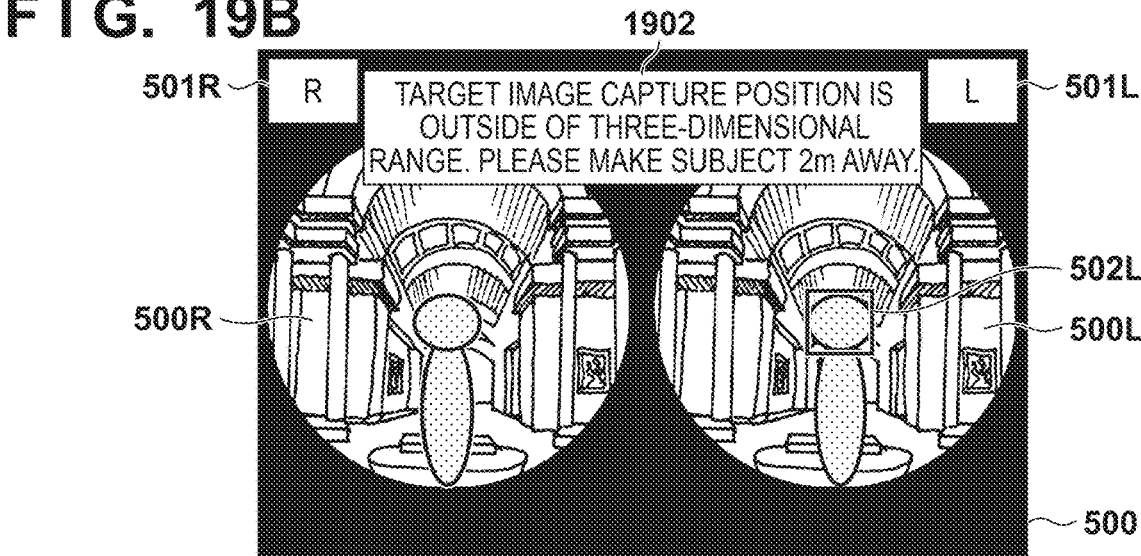

An example of the display of text and an icon will now be described using FIGS. 19A to 19C. FIGS. 19A and 19B illustrate current image capture distance warning text 1901 or target image capture distance warning text 1902 displayed on the live view image 500 when the current image capture distance or the target image capture distance is outside the three-dimensional range. The current image capture distance warning text 1901 and the target image capture distance warning text 1902 are the characters for communicating "outside the three-dimensional range" determined in step S1801 of FIG. 18. Also, for the target image capture distance warning text 1902, text communicating how much the subject needs to be moved to the close range side or the infinite distance side to enter inside the three-dimensional range may be displayed. In a similar manner, for the current image capture distance warning text 1901, text communicating how much the current image capture distance needs to be moved to enter inside the three-dimensional range may be displayed.

Figure 19C:
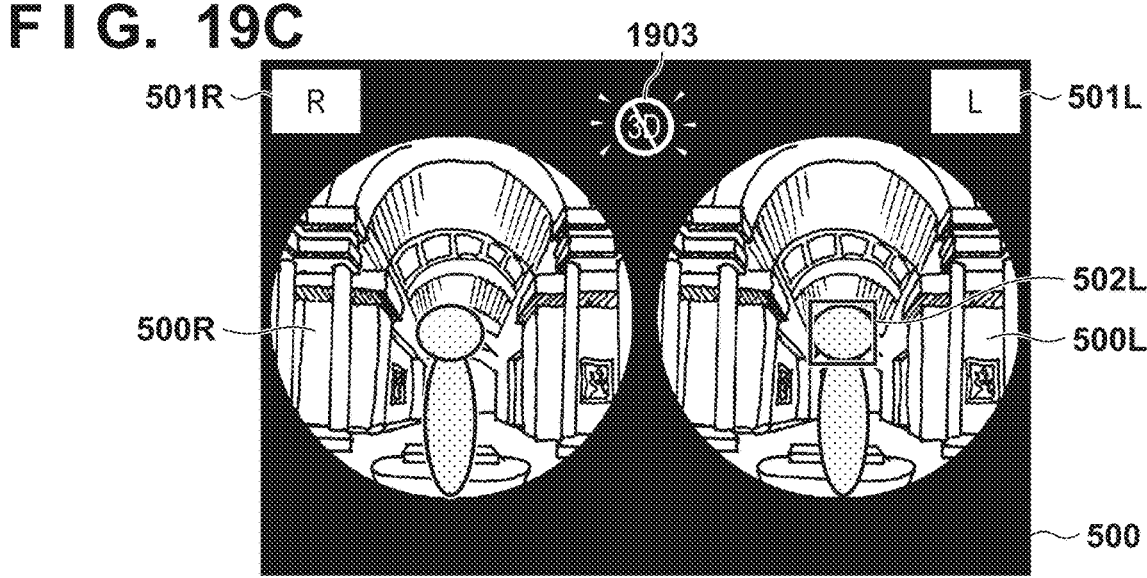

FIG. 19C illustrates a warning icon 1903 displayed on the live view image 500 when the current image capture distance or the target image capture distance is outside the three-dimensional range. The warning icon 1903 is the icon communicating "outside the three-dimensional range" determined in step S1801. The warning icon 1903 may be displayed blinking to emphasis the warning. Also, the warning icon 1903 may be a different icon for warnings for the current image capture distance and the target image capture distance.

Example 2 of Outside Three-Dimensional Range Notification (Notification Via Sound)

An example of a notification for warning that the current image capture distance and the target image capture distance are outside the three-dimensional range by emitting sound from the sound emitter 224 of steps S1401 and S1501 will now be described using FIG. 20.

In step S2001, the system control unit 218 determines the content of the sound to emit to communicate that the current image capture distance and the target image capture distance are outside the three-dimensional range. The content of the sound to emit may be sound for communicating how much the subject needs to move to the close range side or the infinite distance side from the target image capture distance and the three-dimensional range to enter inside the three-dimensional range. In a similar manner, the content may communicate how much the current image capture distance needs to be moved to enter inside the three-dimensional range.

In step S2002, the system control unit 218 emits the sound content determined in step S2001 from the sound emitter 224 and ends the outside three-dimensional range notification processing. Note that during moving image recording, a warning notification using sound is not performed due to the audio recording.

Example 3 of Outside Three-Dimensional Range Notification (Notification Via AF Frame Display)

An example of a notification for warning that the target image capture distance is outside the three-dimensional range via a different display of the AF frame displayed on the live view image 500 performed in step S1501 of FIG. 15 will now be described using FIGS. 21 and 22A and 22B.

FIG. 21 is a flowchart for describing the outside three-dimensional range notification processing of step S1501.

In step S2101, the system control unit 218 determines the AF frame to be displayed on the live view image 500 to indicate that the target image capture distance of step S1501 is outside the three-dimensional range.

In step S2102, the system control unit 218 changes the display of the AF frame on the live view image 500 and ends the outside three-dimensional range notification processing.

An example of the display of the AF frame to be displayed on the live view image 500 indicating that the target image capture distance is outside the three-dimensional range of step S1501 will now be described using FIGS. 22A and 22B.

FIG. 22A illustrates an AF frame 2201 when inside the three-dimensional range being displayed when the target image capture distance is inside the three-dimensional range. FIG. 22B illustrates an AF frame 2202 when outside the three-dimensional range being displayed when the target image capture distance is outside the three-dimensional range. The AF frame 2201 when inside the three-dimensional range is drawn with a solid line, and the AF frame 2202 when outside the three-dimensional range is drawn with a dashed line. The outside three-dimensional range warning notification is performing using these different displays. Note that the AF frame 2201 when inside the three-dimensional range and the AF frame 2202 when outside the three-dimensional range may include an AF frame of different colors, transparency, and shape in the warning notification.

Example 4 of Outside Three-Dimensional Range Notification (Notification Via Superimposed Display on Subject)

An example of a notification for warning that the target image capture distance is outside the three-dimensional range via a superimposed display on the subject in the live view image 500 performed in step S1501 will now be described using FIGS. 23 and 24.

FIG. 23 is a flowchart for describing the outside three-dimensional range notification processing of step S1501.

In step S2301, the system control unit 218 obtains focus detection area information of "outside the three-dimensional range" on the basis of the inside/outside three-dimensional range determination of each focus detection area in step S1305.

In step S2302, the system control unit 218 superimposes a focus detection area which is outside the three-dimensional range obtained in step S2301 on the live view image 500 (live view screen) and ends the outside three-dimensional range notification processing.

An example of a superimposed display on the subject in the live view image 500 indicating that the target image capture distance is outside the three-dimensional range performed in step S1501 will now be described using FIG. 24.

An outside three-dimensional range superimposed display 2401 of FIG. 24 is a superimposed display of a focus detection area which is outside the three-dimensional range displayed in step S2302. The outside three-dimensional range superimposed display 2401 is superimposed with a semitransparent color. Note that a pattern of spots, diagonal lines, or the like may be used in the superimposed display. Also, depending on how much the target image capture distance is away from the three-dimensional range or the direction to the close range side or the infinite distance side of the three-dimensional range, the color, transparency, or pattern may be made different in the display. The outside three-dimensional range superimposed display 2401 may be displayed in only the left lens image 501L or the right lens image 501R or may be displayed in both. Alternatively, the focus detection area inside the three-dimensional range may be superimposed in display.

Note that in the embodiments described above, a phase detection method is used in the focus detection unit for detecting the defocus amount. However, a so-called contrast detection method may be used for the focus detection unit for detecting the focus state of the subject image on the basis of the difference (contrast) in high frequency components included in the imaging signal obtained by an image sensor.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-177769, filed Oct. 13, 2023, which is hereby incorporated by reference herein in its entirety.

What is claimed is:

1. An image capturing apparatus, comprising:
an image capturing device configured to photoelectrically convert a first optical image formed by a first imaging optical system to output a first image, and configured to also photoelectrically convert a second optical image formed by a second imaging optical system arranged in parallel with the first optical system to output a second image; and at least one processor or circuit configured to function as:

a calculating unit configured to, when the first image and the second image are displayed on a display apparatus, calculate a three-dimensional range, which is a range of a subject distance of the image capturing device in which a three-dimensional image looks three-dimensional; and a control unit configured to control the first imaging optical system and the second imaging optical system to limit a range of a subject distance in which automatic focusing of the first imaging optical system and the second imaging optical system is performed to within the three-dimensional range and perform automatic focusing.

2. The image capturing apparatus according to claim 1, wherein the at least one processor or circuit configured to further function as:

a first focus detection unit configured to perform focus detection on a basis of a signal obtained via photoelectric conversion of light incident via the first imaging optical system and a second focus detection unit configured to perform focus detection on a basis of a signal obtained via photoelectric conversion of light incident via the second imaging optical system.

3. The image capturing apparatus according to claim 1, wherein the calculating unit calculates the three-dimensional range on a basis of a size of the display apparatus that displays the first image and the second image, a viewing distance, a parallax angle which is a difference between a convergence angle and an angle when a three-dimensional image jumps out and when a three-dimensional image recedes back at a virtual position, an interval between an optical axis of the first imaging optical system and an optical axis of the second imaging optical system, and angle of view information at a time of image capture.

4. The image capturing apparatus according to claim 3, wherein the at least one processor or circuit configured to further function as:

an input unit configured to input the size of the display apparatus and the viewing distance.

5. The image capturing apparatus according to claim 3, wherein the size of the display apparatus and the viewing distance are a size of a display and a viewing distance in a virtual space of a head mounted display.

6. The image capturing apparatus according to claim 3, wherein the at least one processor or circuit configured to further function as:

an input unit configured to input the parallax angle.

7. The image capturing apparatus according to claim 3, wherein the interval between the optical axis of the first imaging optical system and the optical axis of the second imaging optical system is obtained from the first imaging optical system and the second imaging optical system or input by a user.

8. The image capturing apparatus according to claim 3, wherein the angle of view information at the time of image capture is obtained from the first imaging optical system and the second imaging optical system or calculated on a basis of information including a size of an image sensor and a focal length of the first imaging optical system and the second imaging optical system.

9. The image capturing apparatus according to claim 1, wherein the display apparatus displays the three-dimensional range on a display screen of a live view image obtained via the image capturing device.

10. The image capturing apparatus according to claim 1, wherein the control unit does not put a limit on the three-dimensional range on an infinite distance side of a subject distance.

11. The image capturing apparatus according to claim 2, wherein the first focus detection unit and the second focus detection unit detect a first defocus amount of the first imaging optical system and a second defocus amount of the second imaging optical system on a basis of a signal of a pixel including a plurality of photoelectric conversion elements that receive a light beam that passes through a different pupil area of the first imaging optical system and the second imaging optical system.

12. The image capturing apparatus according to claim 11, wherein the control unit obtains a defocus amount used in focusing of the first imaging optical system and the second imaging optical system on a basis of the first defocus amount and/or the second defocus amount.

13. The image capturing apparatus according to claim 12, wherein the control unit sets a defocus amount with a highest reliability from among the first defocus amount and the second defocus amount as the defocus amount used in the focusing.

14. The image capturing apparatus according to claim 12, wherein the control unit calculates an average value of the first defocus amount and the second defocus amount and sets the average value as the defocus amount used in the focusing.

15. The image capturing apparatus according to claim 1, wherein the calculating unit obtains information of a captured current subject distance from the first imaging optical system and the second imaging optical system or calculates the information of the captured current subject distance via triangulation.

16. The image capturing apparatus according to claim 12, wherein the control unit, in a case where a target image capture distance based on the defocus amount used in the focusing is in the three-dimensional range, uses the defocus amount used in the focusing to focus the first imaging optical system and the second imaging optical system.

17. The image capturing apparatus according to claim 12, wherein the control unit, in a case where a target image capture distance based on the defocus amount used in the focusing is outside the three-dimensional range, moves focus lenses of the first imaging optical system and the second imaging optical system to a position of an end of an image capture distance of the three-dimensional range.

18. The image capturing apparatus according to claim 12, wherein the control unit, in a case where a target image capture distance based on the defocus amount used in the focusing is outside the three-dimensional range and a captured current subject distance is outside the three-dimensional range, moves focus lenses of the first imaging optical system and the second imaging optical system to an end of an image capture distance of the three-dimensional range before searching and driving the focus lenses at a predetermined speed.

19. The image capturing apparatus according to claim 1, wherein the control unit, in a case where a captured current subject distance is outside the three-dimensional range, does not drive focus lenses of the first imaging optical system and the second imaging optical system.

20. The image capturing apparatus according to claim 1, wherein the at least one processor or circuit configured to further function as:

notification unit configured to notify that a captured current subject distance is outside the three-dimensional range.

21. The image capturing apparatus according to claim 12, wherein the at least one processor or circuit configured to further function as:

notification unit configured to notify that a target image capture distance based on the defocus amount used in the focusing is outside the three-dimensional range.

22. The image capturing apparatus according to claim 20, wherein the notification unit displays a warning on the display apparatus via text or an icon.

23. The image capturing apparatus according to claim 20, wherein the notification unit warns via sound.

24. The image capturing apparatus according to claim 20, wherein the notification unit warns via a different AF frame display.

25. The image capturing apparatus according to claim 20, wherein the notification unit performs a superimpose display on a subject on a live view screen.

26. A method for controlling an image capturing apparatus including an image capturing device configured to photoelectrically convert a first optical image formed by a first imaging optical system to output a first image, and configured to also photoelectrically convert a second optical image formed by a second imaging optical system arranged in parallel with the first optical system to output a second image, the method comprising:

when the first image and the second image are displayed on a display apparatus, calculating a three-dimensional range, which is a range of a subject distance of the image capturing means in which a three-dimensional image looks three-dimensional; and controlling the first imaging optical system and the second imaging optical system to limit a range of a subject distance in which automatic focusing of the first imaging optical system and the second imaging optical system is performed to within the three-dimensional range and perform automatic focusing.

27. A non-transitory computer-readable storage medium storing a program for causing a computer to execute a method for controlling an image capturing apparatus including an image capturing device configured to photoelectrically convert a first optical image formed by a first imaging optical system to output a first image, and configured to also photoelectrically convert a second optical image formed by a second imaging optical system arranged in parallel with the first optical system to output a second image, the method comprising:

when the first image and the second image are displayed on a display apparatus, calculating a three-dimensional range, which is a range of a subject distance of the image capturing means in which a three-dimensional image looks three-dimensional; and controlling the first imaging optical system and the second imaging optical system to limit a range of a subject distance in which automatic focusing of the first imaging optical system and the second imaging optical system is performed to within the three-dimensional range and perform automatic focusing.

\* \* \* \* \*